United States Patent
Sen et al.

(10) Patent No.: US 10,165,576 B2
(45) Date of Patent: *Dec. 25, 2018

(54) CONTROLLING TRAFFIC TRANSMISSIONS TO MANAGE CELLULAR RADIO RESOURCE UTILIZATION

(71) Applicant: AT&T Intellectual Property I, L.P., Atlanta, GA (US)

(72) Inventors: Subhabrata Sen, Westfield, NJ (US); Oliver Spatscheck, Randolph, NJ (US); Alexandre Gerber, Madison, NJ (US); Zhuoqing Morley Mao, Ann Arbor, MI (US); Feng Qian, Bloomington, IN (US); Zhaoguang Wang, San Jose, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,416

(22) Filed: Jun. 1, 2018

(65) Prior Publication Data

US 2018/0279314 A1    Sep. 27, 2018

Related U.S. Application Data

(63) Continuation of application No. 15/585,142, filed on May 2, 2017, which is a continuation of application
(Continued)

(51) Int. Cl.
*H04W 72/04* (2009.01)
*H04L 29/06* (2006.01)
(Continued)

(52) U.S. Cl.
CPC ..... *H04W 72/0493* (2013.01); *H04L 65/4069* (2013.01); *H04W 4/18* (2013.01); *H04W 4/06* (2013.01)

(58) Field of Classification Search
CPC .................. H04W 4/18; H04W 4/06
(Continued)

(56) References Cited

U.S. PATENT DOCUMENTS 5,432,775 A    7/1995 Crayford
5,504,803 A    4/1996 Yamada et al.
(Continued)

OTHER PUBLICATIONS

300 Million UMTS Subscribers: Mobile Broadband Goes Global http://www.umts forum.org/contentlview/2522/110/. Downloaded Dec. 14, 2010, 1 page.
(Continued)

*Primary Examiner* — Jaime Holliday
(74) *Attorney, Agent, or Firm* — Amin, Turocy & Watson, LLP

(57) ABSTRACT

Techniques control traffic transmissions to manage radio resource utilization. When content is being streamed to user equipment (UE) and is at least initially intended to be streamed in real time at a constant bitrate, a communication management component can determine whether the content being transmitted to the UE can be delayed, instead of being transmitted in real time. In response to determining that the content can be delayed, the communication management component can facilitate buffering data and periodically streaming the data to the UE in data bursts to reduce use of UE power and radio resources. When transmitting a visual image to a UE, the communication management component can adjust resolution of a visual image to correspond to screen dimensions of the UE based on information indicating screen dimensions of the UE that can be received from the UE.

20 Claims, 14 Drawing Sheets

Related U.S. Application Data

No. 14/996,033, filed on Jan. 14, 2016, now Pat. No. 9,654,950, which is a continuation of application No. 13/528,423, filed on Jun. 20, 2012, now Pat. No. 9,264,872.

(60) Provisional application No. 61/498,823, filed on Jun. 20, 2011.

(51) Int. Cl.
*H04W 4/18* (2009.01)
*H04W 4/06* (2009.01)

(58) Field of Classification Search
USPC .......................................... 455/414.1–414.4
See application file for complete search history.

(56) References Cited

U.S. PATENT DOCUMENTS

| | | |
|---|---|---|
| 5,610,903 A | 3/1997 | Crayford |
| 5,678,036 A | 10/1997 | Lin et al. |
| 5,764,641 A | 6/1998 | Lin |
| 6,011,960 A | 1/2000 | Yamada et al. |
| 6,138,010 A | 10/2000 | Rabe et al. |
| 6,201,966 B1 | 3/2001 | Rinne et al. |
| 6,222,854 B1 | 4/2001 | Dove |
| 6,438,573 B1 | 8/2002 | Nilsen |
| 6,487,183 B1 | 11/2002 | Lo et al. |
| 6,502,131 B1 | 12/2002 | Vaid et al. |
| 6,507,731 B1 | 1/2003 | Hasegawa |
| 6,519,266 B1 | 2/2003 | Manning et al. |
| 6,553,031 B1 | 4/2003 | Nakamura et al. |
| 6,578,077 B1 | 6/2003 | Rakoshitz et al. |
| 6,584,331 B2 | 6/2003 | Ranta |
| 6,816,903 B1 | 11/2004 | Rakoshitz et al. |
| 6,937,609 B1 | 8/2005 | Hong |
| 6,978,143 B1 | 12/2005 | Vlalen |
| 6,999,432 B2 | 2/2006 | Zhang et al. |
| 7,058,826 B2 | 6/2006 | Fung |
| 7,089,380 B1 | 8/2006 | Schober |
| 7,181,667 B2 | 2/2007 | Argyropoulos et al. |
| 7,206,286 B2 | 4/2007 | Abraham et al. |
| 7,209,462 B2 | 4/2007 | Sayeedi |
| 7,215,666 B1 | 5/2007 | Beshai et al. |
| 7,248,887 B2 | 7/2007 | Zhang et al. |
| 7,266,365 B2 | 9/2007 | Ferguson et al. |
| 7,295,119 B2 | 11/2007 | Rappaport et al. |
| 7,317,732 B2 | 1/2008 | Mills et al. |
| 7,349,371 B2 | 3/2008 | Schien et al. |
| 7,349,433 B2 | 3/2008 | Ho |
| 7,398,049 B2 | 7/2008 | Blodgett et al. |
| 7,454,220 B2 | 11/2008 | Zhang et al. |
| 7,471,961 B2 | 12/2008 | Fabien et al. |
| 7,546,367 B2 | 6/2009 | Mandavi |
| 7,620,054 B2 | 11/2009 | Katayama |
| 7,630,346 B2 | 12/2009 | Schein et al. |
| 7,634,542 B1 | 12/2009 | Krause et al. |
| 7,733,832 B2 | 6/2010 | Kwak et al. |
| 7,801,525 B2 | 9/2010 | Benco et al. |
| 7,818,786 B2 | 10/2010 | Yoon et al. |
| 7,853,266 B2 | 12/2010 | Moinet et al. |
| 7,855,951 B2 | 12/2010 | Kim et al. |
| 7,860,063 B2 | 12/2010 | Low et al. |
| 7,860,065 B2 | 12/2010 | Oishi et al. |
| 7,860,522 B2 | 12/2010 | Zhang et al. |
| 7,864,794 B2 | 1/2011 | Diab et al. |
| 7,889,704 B2 | 2/2011 | Hong |
| 7,912,455 B2 | 3/2011 | Adams et al. |
| 7,929,962 B2 | 4/2011 | Bachl et al. |
| 7,934,658 B1 | 5/2011 | Bhatti et al. |
| 8,046,551 B1 | 10/2011 | Sahin |
| 8,054,791 B2 | 11/2011 | Vujcic |
| 8,060,606 B2 | 11/2011 | Friedman et al. |
| 8,064,940 B2 | 11/2011 | Zhang et al. |
| 8,073,908 B2 | 12/2011 | Heins et al. |
| 8,089,925 B1 | 1/2012 | Uhlik et al. |
| 8,103,276 B2 | 1/2012 | Ryu |
| 8,155,022 B1 | 4/2012 | Ainsworth |
| 8,180,550 B2 | 5/2012 | Oshima et al. |
| 8,199,770 B2 | 6/2012 | Diab et al. |
| 8,244,443 B2 | 8/2012 | Oshima et al. |
| 8,249,012 B2 | 8/2012 | Ranta-Aho et al. |
| 8,281,060 B2 | 10/2012 | Supalov et al. |
| 8,284,736 B2 | 10/2012 | Liu et al. |
| 8,428,025 B2 | 4/2013 | Hannu et al. |
| 8,504,002 B2 | 8/2013 | Lenart et al. |
| 8,527,627 B2 | 9/2013 | Gerber et al. |
| 8,537,674 B2 | 9/2013 | Brisebois et al. |
| 8,649,308 B2 | 2/2014 | Ke et al. |
| 8,682,372 B2 | 3/2014 | Islam et al. |
| 8,744,367 B2 | 6/2014 | Gerber et al. |
| 8,849,318 B2 | 9/2014 | Olofsson et al. |
| 8,898,609 B1 | 11/2014 | Gouterman et al. |
| 8,904,008 B2 | 12/2014 | Calder et al. |
| 8,972,572 B2 | 3/2015 | Gerber et al. |
| 9,003,017 B2 | 4/2015 | Gerber et al. |
| 9,220,066 B2 | 12/2015 | Gerber et al. |
| 9,264,872 B2 | 2/2016 | Sen et al. |
| 9,374,824 B2 | 6/2016 | Gerber et al. |
| 2001/0054115 A1 | 12/2001 | Ferguson et al. |
| 2002/0021711 A1 | 2/2002 | Gummalla et al. |
| 2003/0103475 A1 | 6/2003 | Heppe et al. |
| 2003/0117193 A1 | 6/2003 | Lee |
| 2003/0169755 A1 | 9/2003 | Ternovsky |
| 2003/0214962 A1 | 11/2003 | Allaye-Chan et al. |
| 2004/0120309 A1 | 6/2004 | Kurittu et al. |
| 2004/0156572 A1 | 8/2004 | Richardson et al. |
| 2004/0252995 A1 | 12/2004 | Ovadia et al. |
| 2005/0047533 A1 | 3/2005 | Ruelke et al. |
| 2005/0054358 A1 | 3/2005 | Zhang et al. |
| 2005/0096089 A1 | 5/2005 | Ishii et al. |
| 2005/0141541 A1 | 6/2005 | Cuny et al. |
| 2005/0148356 A1 | 7/2005 | Ferguson et al. |
| 2005/0169173 A1 | 8/2005 | Mahdavi |
| 2005/0238042 A1 | 10/2005 | Hong |
| 2006/0056383 A1 | 3/2006 | Black et al. |
| 2006/0187480 A1 | 8/2006 | Tsuchiya et al. |
| 2006/0217118 A1 | 9/2006 | Benco et al. |
| 2006/0234623 A1 | 10/2006 | Wallis et al. |
| 2006/0242228 A1 | 10/2006 | Eggers et al. |
| 2006/0270422 A1 | 11/2006 | Benco et al. |
| 2007/0007436 A1 | 1/2007 | Maksymowicz |
| 2007/0082690 A1 | 4/2007 | Fabien et al. |
| 2007/0110105 A1* | 5/2007 | Usuki ............... H04H 20/26 370/487 |
| 2007/0112739 A1 | 5/2007 | Burns et al. |
| 2007/0115956 A1 | 5/2007 | Beshai et al. |
| 2007/0118316 A1 | 5/2007 | Panis |
| 2007/0171900 A1 | 7/2007 | Beshai et al. |
| 2007/0189205 A1 | 8/2007 | Terry et al. |
| 2007/0211624 A1 | 9/2007 | Schmidt et al. |
| 2007/0254598 A1 | 11/2007 | Bachl et al. |
| 2007/0288526 A1 | 12/2007 | Mankad et al. |
| 2007/0294319 A1 | 12/2007 | Mankad et al. |
| 2007/0298725 A1 | 12/2007 | Ryu |
| 2008/0260087 A1 | 10/2008 | Liang et al. |
| 2008/0304510 A1 | 12/2008 | Qu |
| 2009/0046631 A1 | 2/2009 | Meylan et al. |
| 2009/0077256 A1 | 3/2009 | Madan et al. |
| 2009/0129339 A1 | 5/2009 | Young et al. |
| 2009/0137261 A1 | 5/2009 | Zhang et al. |
| 2009/0185526 A1 | 7/2009 | Barber et al. |
| 2009/0239545 A1 | 9/2009 | Lee et al. |
| 2009/0257378 A1 | 10/2009 | Cuny et al. |
| 2009/0259756 A1* | 10/2009 | Karlsson ............ H04L 47/10 709/228 |
| 2009/0326769 A1 | 12/2009 | Oshima et al. |
| 2009/0326777 A1 | 12/2009 | Oshima et al. |
| 2009/0326779 A1 | 12/2009 | Oshima et al. |
| 2010/0017077 A1 | 1/2010 | Oshima et al. |
| 2010/0046543 A1 | 2/2010 | Parnaby |
| 2010/0118752 A1 | 5/2010 | Suzuki et al. |
| 2010/0136992 A1* | 6/2010 | Harada ............ H04W 56/0005 455/450 |

(56) References Cited

U.S. PATENT DOCUMENTS

| | | |
|---|---|---|
| 2010/0144363 A1 | 6/2010 | De Rosa et al. |
| 2010/0153804 A1 | 6/2010 | Cai et al. |
| 2010/0161387 A1 | 6/2010 | Harrang et al. |
| 2010/0188969 A1 | 7/2010 | Kim et al. |
| 2011/0029664 A1 | 2/2011 | Harrang et al. |
| 2011/0060927 A1 | 3/2011 | Fillingim et al. |
| 2011/0065470 A1 | 3/2011 | Zhang et al. |
| 2011/0179153 A1 | 7/2011 | Maspultra et al. |
| 2011/0230172 A1 | 9/2011 | Pollin et al. |
| 2011/0269463 A1 | 11/2011 | Wang et al. |
| 2011/0280220 A1 | 11/2011 | Jia et al. |
| 2011/0319064 A1 | 12/2011 | Lenart et al. |
| 2012/0008496 A1 | 1/2012 | Saavedra |
| 2012/0020303 A1 | 1/2012 | Barber et al. |
| 2012/0047505 A1 | 2/2012 | Branson et al. |
| 2012/0052814 A1 | 3/2012 | Gerber et al. |
| 2012/0063695 A1 | 3/2012 | Wu et al. |
| 2012/0140633 A1 | 6/2012 | Stanwood et al. |
| 2012/0151041 A1 | 6/2012 | Gerber et al. |
| 2012/0191309 A1 | 7/2012 | Oshima et al. |
| 2012/0218983 A1 | 8/2012 | Noh et al. |
| 2012/0230240 A1 | 9/2012 | Nebat et al. |
| 2012/0233237 A1 | 9/2012 | Roa et al. |
| 2012/0265875 A1 | 10/2012 | Moran et al. |
| 2012/0322515 A1 | 12/2012 | Hwang et al. |
| 2012/0324041 A1 | 12/2012 | Gerber et al. |
| 2013/0007255 A1 | 1/2013 | Gerber et al. |
| 2013/0016736 A1 | 1/2013 | Pamaby |
| 2013/0179289 A1 | 7/2013 | Calder et al. |
| 2013/0179574 A1 | 7/2013 | Calder et al. |
| 2013/0227060 A1 | 8/2013 | Sheynman et al. |
| 2013/0315088 A1 | 11/2013 | Gerber et al. |
| 2014/0095706 A1 | 4/2014 | Raleigh et al. |
| 2014/0228040 A1 | 8/2014 | Gerber et al. |
| 2015/0003361 A1 | 1/2015 | Palat et al. |
| 2015/0067682 A1 | 3/2015 | Calder et al. |
| 2015/0327057 A1 | 11/2015 | Gerber et al. |
| 2015/0334173 A1 | 11/2015 | Coulmeau et al. |
| 2016/0286415 A1 | 9/2016 | Gerber et al. |

OTHER PUBLICATIONS

Configuration of Fast Dormancy in Release-8. 3GPP discussion and decision notes RP-090960, 3GPP TSG-RAN#45, Sevilla, Spain Sep. 15-18, 2009. Last accessed Feb. 11, 2011, 3 pages.

System Impact of Poor Proprietary Fast Dormancy Implementations. 3GPP discussion and decision notes RP-090941, TSG-RAN meeting #45 , Seville, Spain, Sep. 15-18, 2009. Last accessed Feb. 11, 2011, 2 pages.

Falaki, et al. A First Look at Traffic on Smartphones. IMC'10, Nov. 1-3, 2010, Melbourne, Australia. http://research.microsofl.com/en-us/um/people/ratul/paperslimc2010-smartphone traffic.pdf. Last accessed Feb. 11, 2011, 7 pages.

Balasubramanian, et al. Augmenting Mobile 3G Using WiFi. MobiSys'10, Jun. 15-18, 2010, San Francisco, Califomia, USA. http://research.microsofl. com/enus/um/people/ratul/papers/mobisys2010-wiffler. pdf. Last accessed Feb. 11, 2011, 13 pages.

Balasubramanian, et al. Energy Consumption in Mobile Phones: A Measurement Study and Implications for Network Applications. IMC'09, Nov. 4-6,2009, Chicago, Illinois, USA. Last accessed Dec. 15, 2010, 14 pages.

Chakravorty, et al. WWW Performance over GPRS. In IEEE MWCN, 2002. http://www.cl.cam.ac.uklresearch/srg/netos/coms/rc277/mwcn_cr.pdf. Last accessed Feb. 11, 2011, 5 pages.

Huang, et al. Anatomizing Application Performance Differences on Smartphones. MobiSys'10, Jun. 15-18, 2010, San Francisco, California, USA. http://research.microsofl.com/pubs1131377/MobiSysl 03GTesl.pdf. Last accessed Feb. 11, 2011, 13 pages.

Falaki, et al. Diversity in Smartphone Usage. MobiSys'10, Jun. 15-18, 2010, San Francisco, California, USA. http://portal.acm.org/citation.cfm?id=1814453&CFID=9592070&CFTOKEN=64926078. Last accessed Feb. 11, 2011, 16 pages.

Qian, et al. Characterizing Radio Resource Allocation for 3G Networks. IMC'10, Nov. 1-3, 2010, Melbourne, Australia. Last accessed Dec. 15, 2010, 14 pages.

Qian, et al. TOP: Tail Optimization Protocol for Cellular Radio Resource Allocation. In ICNP, 2010. http:llwww.eecs.umich.edu/-zmao/Papers/ICNP2010.pdf. Last accessed Feb. 11, 2011, 10 pages.

Schulman. et al. Bartendr: A Practical Approach to Energy-aware Cellular Data Scheduling. MobiCom'10, 12 Sep. 20-24, 2010, Chicago, Illinois, USA. http://www.cs.umd.edui-schulman/docs/mobicom10-bartendr.pdf. Last accessed Feb. 11, 2011, 12 pages.

Shepard, et al. LiveLab: Measuring Wireless Networks and Smartphone Users in the Field. In Hot-Metrics, 2010. http://hotmetrics.cs.caltech.edu/pdfs/paper12_final.pdf. Last accessed Feb. 11, 2011, 5 pages.

Zhang, et al. Accurate Online Power Estimation and Automatic Battery Behavior Based Power Model Generation for Smartphones. CODES+ISSS'10, Oct. 24-29, 2010, Scottsdale, Arizona, USA. http://www.eecs.umich.edu/-zhiyunq/pub/powertutor.pdf. Last accessed Feb. 11, 2011, 10 pages.

Qian et al. iMAP: Intelligent Mobile Application Profiling Tool. Last accessed Oct. 13, 2010, 14 pages.

iMAP: Intelligent Mobility Application Profiling Tool. Last accessed Sep. 16, 2010, 6 pages.

Liers. Static RRC Timeouts for Various Traffic Scenarios. In PIMRC, 2007, IEEE 18th International Symposium on Personal, Indoor and Mobile Radio Communications, 2007, Sep. 3-7, 2007, Athens, pp. 1-5. http://ieeexplore.ieee.org/Xplore/login.jspurl=http:/lieeexplore.ieee.org/iel5/4393982/4393983/04394275.pdf%3Farnumber%3D4394275&authDecision=-203.

Yeh, et al. Comparative Analysis of Energy-Saving Techniques in 3GPP and 3GPP2 Systems. IEEE Transactions on Vehicular Technology, Jan. 2009, vol .58, Issue 1, pp. 432-448. http://ieeexplore.ieee.org/Xplore/defdenyjsp? url=http:/lieeexploreieee.org/stamp/stamplsp%3Ftp%3D%26arnumber%3D4490170%26user Type%3D&denyReason=-134&arnumber=4490 170&productsMatched=null&user Type=.

Sharma. Simplicity of LTE and its differences with UMTS RRC. posted online on Aug. 6, 2009. http://3g4g.blogspot.com/2009/08/simplicity-of-lte-and-its-differences.html. 2 pages.

Ue "Fast Dormancy" Behaviour. 3GPP discussion and decision notes R2-075251, 2007. 3GPP TSG-RAN WG2, Jeju, South Korea, Nov. 5-9, 2007. http://flp.3gpp.org/specs/html-infoITDocExMtg-R2-60-26016.htm. Last accessed Dec. 9, 2010, 12 pages.

Configuration of Fast Dormancy in Release-8. 3GPP discussion and decision notes RP-090960, 2009, Seville, Spain Sep. 15-18, 2009. http://flp.3gpp.org/specs/html-infoITDocExMtg-RP-45-26390.htm. Last accessed Dec. 9, 2011 3 pages.

System Impact of Poor Proprietary Fast Dormancy Implementations. 3GPP discussion and decision notes RP-090941, Seville, Spain, Sep. 15-18, 2009. http://3g4g.blogspot.com/201011 0/fast-dormancy-in-release-8.html. Last accessed Dec. 10, 2010, 2 pages.

Anand, et al. Self-Tuning Wireless Network Power Management. Wireless Networks, 11(4),2005, Proceedings of the 9th Annual International Conference on Mobile Computing and Networking, MobiCom'03. http://portal.acm.org/citation.cfm?id=939004&CFID=1282940&CFTOKEN=71 026603. Last accessed Dec. 10, 2010, 14 pages.

Chatterjee, et al. Optimal MAC State Switching for cdma2000 Networks. IEEE 0-7803-7476-2/02, INFOCOM 2002. 2002.http://crewman.uta.edu/publicationfiles/cdma-mainak.pdf. Last accessed Dec. 10, 2010, 7 pages.

System Parameter Recommendations to Optimize PS. Data User Experience and UE Battery Life, Engineering Services Group, 80-WII12-1, Revision B, Mar. 2007. http://www.qualcomm.co.in/common/documentslwhite_papers/ESG_Optimizing_PS_Data_User Experience_RevB.pdf. Last accessed Dec. 10, 2010, 9 pages.

Ghaderi, et al. TCP-Aware Resource Allocation in Coma Networks. MobiCom'06, Sep. 23-26, 2006, Los Angeles, California, USA. http://delivery.acm.orgl10.11451117000011161114/p215-ghaderi.pdf? key=1161114&key2=4990991921 &coll=DL&dl=ACM&CFID=1282940&CFTOKEN=71 026603. Last accessed Dec. 10, 2010, 12 pages.

Haverinen, et al. Energy Consumption of Always-On Applications in WCDMA Networks. Proceedings of IEEE Vehicular Technology

(56) References Cited

OTHER PUBLICATIONS

Conference, 2007. http://www.pasieronen.com/publications/haverinen_siren_eronen_vtc2007.xlf. Last accessed Dec. 20, 2010, 5 pages.
Liu, et al. Experiences in a 3G Network: Interplay between the Wireless Channel and Applications. MobiCom'08, Sep. 14-19, 2008, San Francisco, California, USA. http://citeseerx.ist.psu.edulviewdoc/summary?doi=10.1.1142.8214. Last accessed Dec. 20, 2010, 12 pages.
Sridharan, et al. Distributed Uplink Scheduling in COMA Networks. In Proceedings of IFIP-Networking 2007, May 2007. http://citeseerx.isl.psu.edu/viewdoc/summary?doi=10.1.1.86.5478. Last accessed Dec. 20, 2010, 12 pages.
Zhuang, et al. A3: AppiicationAware Acclereation for wireless data Networks. MobuCom'06, Septemtier 23-26, 2006, Los Angeles, California, USA. http://www.google.co.in/url?sa=t&source=web&cd=1&ved=OCBYQFjAA&url=http%3A%2F%2Fciteseerx.isl.psu.edu%2Fviewdoc%2Fdownload%3Fdoi%3Dl0.I.I.135.2488%26rep%3Drep1%26type%D3Dpdf&rct=j&q=A3%3A%20ApplicationAware%20Acceleration%20for%20Wireless%20Data%20Networks&ei=NEoPTZLbLYaKlwf9kIzICw&usg=AFQjCNGrsXHqsbDm7u Bavg7KjOF02-J Q. Last accessed Dec. 20, 2010, 12 pages.
LEE, et al. Impact of Inactivity Timer on Energy Consumption in WCDMA and cdma2000 http://ir.lib.nthu.edu.tw/bitstreamf98765432111857311/2030228030019.pdf. Last accessed Dec. 20, 2010, 10 pages.
Li, et al. Service Quality's Impact on Mobile Satisfaction and Intention to Use 3G Service. Proceedings of the 42nd Hawaii International Conference on System Sciences—2009, IEEE 978-0-7695-3450-3/09. http://www.computer.org/portal/web/csd1/doi110.1109/HICSS.2009.902. Last accessed Dec. 20, 2010, 10 pages.
"Chuah, et al. Impacts of Inactivity Timer Values on UMTS System Capacity. In Wireless Communications and Networking Conference, 2002, vol. 2, pp. 897-903. http://ieeexplore.ieee.org/Xplore/login.jsp?url=http:Ilieeexplore.Dieee.org/iel5/7793/21424/00993390.pclf%3Farnumber%3D993390&authDecision=-203".
Liers, et al. Static RRC Timeouts for Various Traffic Scenarios. In Proceedings of International Symposium on Personal, Indoor and Mobile Radio Communications (PIMRC), Sep. 3-7, 2007, pp. 1-5. http://ieeexplore.ieee.org/articleSale/Sarticle.jsp?arnumber=4394275.
Liers, et al. UMTS Data Capacity Improvements Employing Dynamic RRC Timeouts. In Proceedings of InternationaL 18 Symposium on Personal, Indoor and Mobile Radio Communications, PIMRC, Sep. 11-14, 2005, volA, pp. 2186-2190. http://ieeexplore.ieee.org/xpi/freeabs_all.jsp?arnumber=1651833&abstractAccess=no&userType=.
"Talukdar, et al. Radio Resource Control Protocol Configuration for Optimum Web Browsing. In Proceedings IEEE 56th Vehicular Technology Conference, 2002, vol. 3, pp. 1580-1584. http://ieeexplore.ieee.org/xpi/freeabs_all.jsp? 7arnumber=1040482".

Tan, et al. Measurement-based Performance Model of IP Traffic over 3G Networks. TENCON 2005, IEEE Region 10, pages 1-5, Nov. 2005. http://ieeexplore.ieee.org/xpl/freeabs_all.jsp?arnumber=4085057.
Yeh, et al. Comparative Analysis of Energy-Saving Techniques in 3GPP and 3GPP2 Systems. IEEE transactions on vehicular technology, 58(1):432-438, Jan. 2009. http://ieeexplore.ieee.org/Xplore/login.jsp?url=http:Ilieeexplore.ieee.org/ie15/25/4356907/04490170.pdf%3F arnurnber%3D4490 170&auth Decision=-203.
Non-Final Office Action dated Oct. 12, 2012 for U.S. Appl. No. 12/967,627, 19 pages.
Notice of Allowance dated May 1, 2013 for U.S. Appl. No. 12/967,627, 17 pages.
Non-Final Office Action dated Mar. 12, 2013 for U.S. Appl. No. 12/872,604, 27 pages.
Final Office Action dated Sep. 5, 2013 for U.S. Appl. No. 12/872,604, 53 pages.
Non-Final Office Action dated Dec. 18, 2013 for U.S. Appl. No. 13/164,112, 38 pages.
Final Office Action dated Jul. 2, 2014 for U.S. Appl. No. 13/164,112, 13 pages.
Notice of Allowance dated Oct. 22, 2014 for U.S. Appl. No. 13/956,028, 34 pages.
Final Office Action dated Jan. 26, 2015 for U.S. Appl. No. 13/528,423, 36 pages.
Non-Final Office Action dated Jul. 16, 2014 for U.S. Appl. No. 13/528,423, 64 pages.
Non-Final Office Action dated Aug. 26, 2015 for U.S. Appl. No. 14/257,600, 55 pages.
Notice of Allowance dated Feb. 19, 2016 for U.S. Appl. No. 14/257,600, 62 pages.
Non-Final Office Action dated Feb. 24, 2016 for U.S. Appl. No. 14/996,033, 42 pages.
Non-Final Office Action dated Jun. 10, 2016 for U.S. Appl. No. 14/601,803, 46 pages.
Non-Final Office Action dated Aug. 24, 2016 for U.S. Appl. No. 141996,033, 38 pages.
Non-Final Office Action dated Nov. 29, 2016 for U.S. Appl. No. 14/801,793, 57 pages.
"Understanding Jitter in Transport Networks", Anritsu, 2008, retrieved Nov. 29, 2016, 11 pages.
Non-Final Office Action dated Sep. 20, 2017 for U.S. Appl. No. 15/585,142, 85 pages.
Non-Final Office Action dated Oct. 4, 2017 for U.S. Appl. No. 15/179,960, 81 pages.
Final Office Action dated Mar. 28, 2018 for U.S. Appl. No. 15/179,960, 68 pages.
Final Office Action dated Jul. 20, 2018 for U.S. Appl. No. 15/179,960, 108 pages.

* cited by examiner

CONTROLLING TRAFFIC TRANSMISSIONS TO MANAGE CELLULAR RADIO RESOURCE UTILIZATION

CROSS-REFERENCE TO RELATED APPLICATIONS

This application is a continuation of, and claims priority to each of, U.S. patent application Ser. No. 15/585,142, filed May 2, 2017, and entitled "Controlling Traffic Transmissions To Manage Cellular Radio Resource Utilization," which is a continuation of U.S. patent application Ser. No. 14/996,033, filed Jan. 14, 2016, now U.S. Pat. No. 9,654,950, and entitled "Controlling Traffic Transmissions To Manage Cellular Radio Resource Utilization," which is a continuation of U.S. patent application Ser. No. 13/528,423, filed Jun. 20, 2012, now U.S. Pat. No. 9,264,872, and entitled "Controlling Traffic Transmissions To Manage Cellular Radio Resource Utilization," each of which applications claim priority to U.S. Provisional Patent Application No. 61/498,823, filed Jun. 20, 2011, and entitled "Best Practices/OS Support For Smartphone Applications," the entireties of which applications are hereby incorporated herein by reference. This application also is related to U.S. patent application Ser. No. 13/164,112, filed Jun. 20, 2011, now U.S. Pat. No. 9,220,066, and entitled "Bundling Data Transfers And Employing Tail Optimization Protocol To Manage Cellular Radio Resource Utilization," the entirety of which application is hereby incorporated herein by reference.

TECHNICAL FIELD

This disclosure relates to network communications, e.g., to controlling traffic transmissions to manage cellular radio resource utilization.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

Users can use communication devices (e.g., mobile phone, electronic tablet or pad, etc.) to access a wireless communication network to, for example, perceive (e.g., watch and/or listen to) a program being streamed to the communication device. In wireless communication networks (e.g., cellular networks), when a program is being streamed, continuously streaming traffic of the program at a constant low bitrate can cause significant inefficiencies in resource utilization, as the communication device can be constantly using the wireless communication channel (e.g., dedicated channel (DCH)), whose available bandwidth can be significantly underutilized due to the relatively low constant-bitrate streaming.

Another issue relating to wireless communications to communication devices involves image sizes in relation to high-resolution images. Different communication devices can have different screen dimensions. When content that includes a visual image is being downloaded from a server to a communication device, the visual image may have a relatively high resolution, which can result in transmission of a relatively large amount of data to the communication device. However, the communication device receiving the content, including the high-resolution visual image, may have a relatively small screen size. As a result, transmission of the relatively large amount of data representing the high-resolution visual image can be wasteful and unnecessary, since the screen size of the communication device is too small to fully display the high-resolution visual image in its original size.

The above-described description is merely intended to provide a contextual overview of wireless communication networks, and is not intended to be exhaustive.

DETAILED DESCRIPTION

Figure 1:
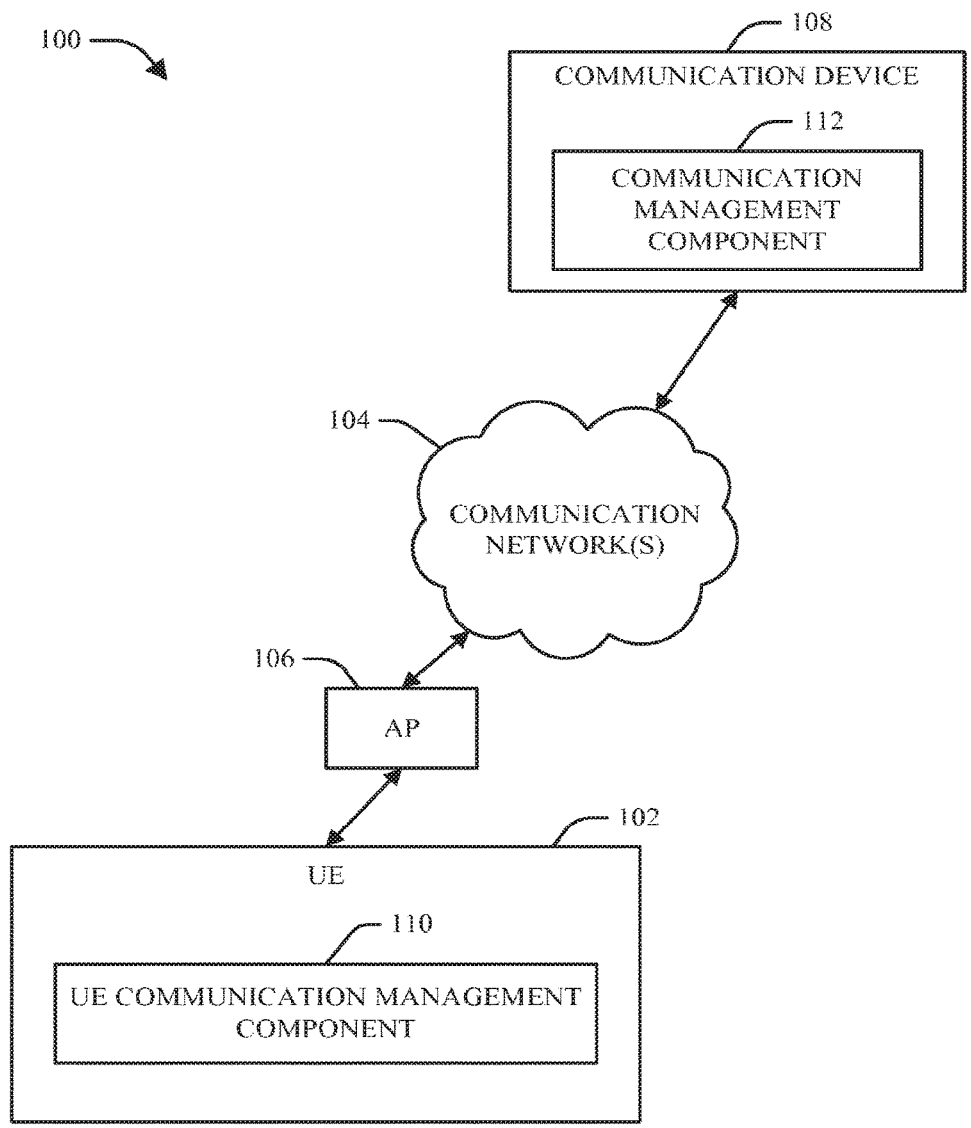
FIG. 1 illustrates a block diagram of an example system that can control data transfers associated with a communication device to facilitate managing radio resource utilization in accordance with various aspects and embodiments described herein.

The following presents a simplified overview of various aspects of the disclosed subject matter in order to provide a basic understanding of such aspects. This is not an extensive overview of all contemplated aspects, and is intended to neither identify key or critical elements nor delineate the scope of such aspects. Its sole purpose is to present some concepts of the disclosed subject matter in a simplified form as a prelude to the more detailed description of the disclosed subject matter that is presented later. It will also be appreciated that the detailed description may include additional or alternative embodiments beyond those described in this overview.

The disclosed subject matter can include a system that can include at least one memory storing computer-executable instructions; and at least one processor, communicatively coupled to the at least one memory, that facilitates execution of the computer-executable instructions. The at least one processor facilitates the execution of the computer-executable instructions to at least: determine whether it is permissible for content to be received by a user equipment using a plurality of separate data bursts comprising respective portions of the content without using a continuous stream at a constant bitrate; and receive the respective portions of the content in respective data bursts of the plurality of separate data bursts in response to a determination that it is permissible for the content to be received by the user equipment using the plurality of separate data bursts comprising the respective portions of the content instead of reception of the content using the continuous stream at the constant bitrate.

The disclosed subject matter also can include a method, comprising: determining, by a system including at least one processor, whether it is acceptable to communicate content to a user equipment from a communication device using a plurality of separate data bursts comprising respective portions of the content instead of communicating the content using a continuous stream at a constant bitrate; and communicating, by the system, the respective portions of the content to the user equipment using respective data bursts of the plurality of separate data bursts in response to determining that it is acceptable to communicate the content to the user equipment from the communication device using the plurality of separate data bursts comprising the respective portions of the content instead of communicating the content using the continuous stream at the constant bitrate.

The disclosed subject matter further can comprise a system that can include at least one memory storing computer-executable instructions; and at least one processor, communicatively coupled to the at least one memory, that facilitates execution of the computer-executable instructions. The at least one processor facilitates the execution of the computer-executable instructions to at least: determine whether it is acceptable to transmit content to a user equipment using a plurality of separate data bursts comprising respective portions of the content instead of transmission of the content using a continuous stream at a constant bitrate; and transmit the respective portions of the content to the user equipment using respective data bursts of the plurality of separate data bursts in response to a determination that it is acceptable to transmit the content to the user equipment using the plurality of separate data bursts comprising the respective portions of the content instead of transmission of the content using the continuous stream at the constant bitrate.

The above overview is merely intended as a preface of the more detailed description that follows. The following part of the detailed description and the annexed drawings set forth in detail certain illustrative aspects of the disclosed subject matter. These aspects are indicative, however, of but a few of the various ways in which the principles of the disclosed subject matter may be employed. The disclosed subject matter is intended to include all such aspects and their equivalents. Other advantages and distinctive features of the disclosed subject matter will become apparent from the following part of the detailed description of the disclosed subject matter when considered in conjunction with the drawings.

Users can use communication devices (e.g., mobile phone, electronic tablet or pad, etc.) to access a wireless communication network to, for example, perceive (e.g., watch and/or listen to) a program being streamed to a communication device. In wireless communication networks (e.g., cellular networks), when a program is being streamed, continuously streaming traffic of the program at a constant low bitrate can cause significant inefficiencies in utilization of radio resources and other types of resources (e.g., power), as the communication device can be constantly using the wireless communication channel (e.g., dedicated channel (DCH)), whose available bandwidth can be significantly underutilized due to the relatively low constant-bitrate streaming.

Another issue relating to wireless communications to communication devices involves image sizes in relation to high-resolution images. Different communication devices can have different screen dimensions or display characteristics. For instance, when content that includes a visual image is being downloaded from a server to a communication device, the visual image may have a relatively high resolution, which can result in transmission of a relatively large amount of data to the communication device. However, the communication device receiving the content, including the high-resolution visual image, may have a relatively small screen size. As a result, transmission of the relatively large amount of data representing the high-resolution visual image can be wasteful and unnecessary, since the screen size of the communication device is too small to fully display the high-resolution visual image in its original size.

To that end, techniques for controlling traffic (e.g., voice or data traffic) transmissions to manage radio resource (e.g., cellular radio resource) utilization are presented herein. In accordance with various implementations, the disclosed subject matter can use bursty streaming of traffic, control image size of images, employ efficient scheduling of traffic, use fast dormancy, and/or use a tail optimization protocol (TOP) to facilitate efficiently managing radio resource utilization in relation to communications associated with user equipment (UE) (e.g., mobile phone, electronic tablet or pad, etc.).

A UE can include a UE communication management component that can manage traffic communications between the UE and other communication devices (e.g., server, computer, etc.) associated with a communication network. In some implementations, another communication device (e.g., server, computer, etc.) can include a communication management component that can communication, coordinate, and/or negotiate with the UE communication management component to facilitate managing radio resource utilization associated with the UE. When content (e.g., video or audio content) is being streamed to the UE and is at least initially or tentatively intended to be streamed in real time at a constant bitrate, the UE communication management component and/or the communication management component of the other communication device can determine whether the content being transmitted to the UE can be delayed, instead of being transmitted in real time. In response to the UE communication management component and/or the communication management component determining that the content can be delayed, the communication management component can facilitate buffering data (e.g., by storing the buffered data in a queue and/or buffer component) and periodically streaming (e.g., bursty streaming) portions of the data to the UE in data bursts to reduce use of UE power and radio resources.

In some implementations, the UE communication management component can coordinate with the communication management component associated with the UE to group (e.g., bundle, batch) the data transfers associated with the streamed content and/or other data transfers (e.g., delay-sensitive data transfers or other data transfers associated with a different application(s) or server(s)) to communicate them to the UE in a single data burst instead of communicating these data transfers in multiple data bursts. The UE communication management component also can utilize fast dormancy and/or the TOP protocol to optimize tails and the scheduling of tail removals at the connection level, e.g., at the end of a data transfer to facilitate further improving (e.g., reducing, minimizing, optimizing, etc.) radio resource utilization associated with the UE.

In some implementations, when a visual image is to be transmitted to the UE by the communication device, the UE communication management component can transmit information relating to the UE that can provide an indication of the dimensions of the screen size or other display screen characteristics associated with the UE to the other communication device. The communication management component associated with the other communication device can analyze the information relating to the UE, and, based at least in part on the analysis results, can identify the screen dimensions and/or other display screen characteristics of the UE. The communication management component can adjust resolution and/or other display characteristics of the visual image to correspond to screen dimensions and/or other display characteristics of the UE based at least in part on the received information relating to the UE. The other communication device can transmit the adjusted visual image and/or other associated content to the UE for presentation (e.g., display) by the UE.

If the UE communication management component determines that the transfer of the adjusted visual image is not time sensitive and can be scheduled as desired (e.g., delayed if desired), or determines that there is another data transfer that can have its transfer time adjusted to be sent in a same data burst as the adjusted visual image, the UE communication management component can schedule the data transfer of the visual image along with other data transfers to group the transfer of the visual image and the other data transfers (e.g., time-sensitive data transfers or other data transfers associated with a different application(s) or server(s)) in a single data burst to transfer these data transfers to the UE via a communication channel being utilized by the UE, instead of transferring these data transfers in multiple data bursts. The UE communication management component also can utilize fast dormancy and/or the TOP protocol to optimize tails and the scheduling of tail removals at the connection level, e.g., at the end of this data transfer (e.g., single data burst) to further improve radio resource utilization associated with the UE.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Referring now to the drawings, FIG. 1 illustrates a block diagram of an example system 100 that can control data transfers associated with a communication device (e.g., UE) to facilitate managing radio resource utilization in accordance with various aspects and embodiments described herein. The system 100 can comprise a UE 102 (e.g., mobile and/or wireless communication device, such as a mobile phone (e.g., 3GPP Universal Mobile Telecommunications System (UMTS) phone), personal digital assistant (PDA), computer, set-top box, electronic notebook, electronic pad or tablet, portable electronic gaming device, etc.) that can operate and communicate in a communication network environment. In an aspect, the UE 102 can be communicatively connected via a wireless communication connection(s) to a communication network 104 via an AP 106.

In an aspect, as the UE 102 is moved through a wireless communication network environment, at various times, the UE 102 can be connected (e.g., wirelessly connected) to one of a plurality of APs (e.g., macro or cellular AP, femto AP, pico AP, Wi-Fi AP, Wi-Max AP, etc.), such as an AP 106, that can operate in the wireless communication network environment. An AP (e.g., 106) can serve a specified coverage area to facilitate communication by the UE 102 or other UEs in the wireless communication network environment. The AP 106 can serve a respective coverage cell (e.g., macrocell, femtocell, picocell, etc.) that can cover a respective specified area, and the AP 106 can service mobile wireless devices, such as UE 102, located in the respective area covered by the respective cell, where such coverage can be achieved via a wireless link (e.g., uplink (UL), downlink (DL)). When an attachment attempt is successful, the UE 102 can be served by the AP 106 and incoming voice and data traffic can be paged and routed to the UE 102 through the AP 106, and outgoing voice and data traffic from the UE 102 can be paged and routed through the AP 106 to other communication devices (e.g., another UE) in the communication network environment. In an aspect, the UE 102 can be connected and can communicate wirelessly using virtually any desired wireless technology, including, for example, cellular, Wi-Fi, Wi-Max, wireless local area networks (WLAN), etc.

The communication network 104 (e.g., Third Generation (3G), Fourth Generation (4G), or x Generation (xG) network, where x can be virtually any desired integer or real value) can facilitate wireless connection with the UE 102 via the AP 106 and facilitate communication by or between the UE 102 and another UE(s) or other type of communication device(s) (e.g., computer, server (e.g., application server;

content server that can be provide video content, audio content, and/or other content comprising other types of information; notification system or server; etc.), etc.), such as communication device 108, associated with the communication network 104 in the communication network environment. The communication network 104 (e.g., a core network, or network comprising a core network and/or IP-based network) can facilitate routing voice and data communications between a communication device(s) (e.g., UE 102) and other communication devices (e.g., another UE, a server, etc.) associated with the communication network 104 in the communication network environment.

The communication network 104 also can allocate resources to the UE 102 or other UEs in the communication network 104, convert or enforce protocols, establish and enforce Quality of Service (QoS) for the UEs, provide applications or services in the communication network 104, translate signals, and/or perform other desired functions to facilitate system interoperability and communication in the communication network 104 (e.g., wireless portion of the communication network 104 or wireline portion of the communication network 104). The communication network 104 further can include desired components, such as routers, nodes, switches, interfaces, controllers, etc., that can facilitate communication of data between communication devices in the communication network environment.

In accordance with various aspects and embodiments, the UE 102 can comprise a UE communication management component 110 that can desirably (e.g., optimally, acceptably, permissibly, etc.) control communication of data between the UE 102 and another communication device(s), such as communication device 108. The UE communication management component 110 can be part of or can operate in conjunction with the operating system (OS) of the UE 102 and/or an application(s) to facilitate controlling communication, scheduling, and/or batching of data transfers associated with the UE 102.

In accordance with various aspects and embodiments, the communication device 108 can include a communication management component 112 that can coordinate with the UE communication management component 110 to desirably control communication of data between the UE 102 and the communication device 108 or another communication device(s). The UE communication management component 110 can be part of or can operate in conjunction with the OS of the communication device 108 and/or an application(s) of the communication device 108 to facilitate controlling communication, scheduling, and/or batching of data transfers associated with the UE 102.

In certain instances, the UE 102 can request information (e.g., video or audio content) from the communication device 108. The communication device 108 may ordinarily communicate the requested information to the UE 102 via a communication channel (e.g., a dedicated channel (DCH) that can be in a high power active communication state) using a constant bitrate. However, communicating the requested information via the communication channel using a constant bitrate can be an inefficient use of radio resources. The UE communication management component 110 and the communication management component 112 can operate to efficiently communicate the requested information to the UE 102 to desirably (e.g., optimally, acceptably, etc.) manage radio resource utilization associated with the UE 102.

In some implementations, when information (e.g., video or audio content) is being streamed to the UE 102 and is at least initially or tentatively intended to be streamed in real time at a constant bitrate, the UE communication management component 110 and/or the communication management component 112 of the other communication device 108 can determine whether the content being transmitted to the UE 102 can be delayed for a period of time (e.g., 10 seconds, 20 seconds, 30 seconds, . . . , 1 minute, . . . ) and sent to the UE 102 in separate bursty streams (e.g., separate data bursts)), for example, without undesired or unacceptable disruption of the presentation of the information by the UE 102, instead of being transmitted in real time to the UE 102 for presentation, in accordance with one or more defined traffic communication criterion. The one or more defined traffic communication criterion can relate to and/or be based at least in part on, for example, network policies of the communication network 104, type of subscription the UE 102 or associated user has with the wireless service provider, type of subscription the UE 102 or associated user has in relation to the content being provided by the communication device 108, user preferences of the user of the UE 102, user preferences or content provider policies associated with the communication device 108, information in a user profile associated with the user and/or UE 102, data transfer parameters, TOP parameters, etc.

For example, a content provider policy associated with the communication device 108 providing the content can specify that content to be streamed to a wireless communication device, such as the UE 102, can be delayed and transmitted in separate bursty streams at specified times (e.g., at regular or varying time intervals), instead of streaming the content to the UE 102 in real time. As another example, a particular subscription for wireless services associated with the UE 102 and/or user of the UE 102 can specify that transmission of content to the UE 102 from a content provider (e.g., communication device 108) can be delayed and transmitted in separate bursty streams, instead of being communicated in real time via a communication channel at a constant bitrate. As still another example, a user associated with the UE 102 can select a user preference indicating that transmission of content to the UE 102 from a content provider (e.g., communication device 108) can be delayed and transmitted in separate bursty streams, instead of being communicated in real time via a communication channel at a constant bitrate.

Based at least in part on (e.g., in response to) the example content provider policy, the example subscription associated with the UE 102 and/or UE user, or the example user preference of the UE user, the communication management component 112 can control transmission of the content to have the communication device 108 transmit respective portions of the content in respective data bursts to the UE 102 at specified times. To facilitate controlling transmission of the content to transmit the respective portions of the content in respective data bursts to the UE 102 at specified times, the communication management component 112 can buffer the data associated with the content (e.g., in a queue and/or buffer component) until such data is scheduled to be transferred to the UE 102. The UE communication management component 110 can coordinate the scheduling of the transmission of the respective data bursts with the communication management component 112 to have at least some of the data transfers of respective portions of content bundled together with other data transfers (e.g., periodic and/or time-sensitive data transfers) to communicate the bundled data transfers in a single data burst instead of having these data transfers sent in separate data bursts. For instance, the UE communication management component 110 can schedule data transfers to bundle a data transfer of content from the communication device 108 with one or more other data transfers associated with the communication device 108 and/or another communication device (e.g., a server associated with another application) to have these bundled transfers transmitted to the UE 102 in a single data burst. In some implementations, the UE communication management component 110 also can utilize fast dormancy and/or the TOP protocol to desirably (e.g., acceptably, optimally, etc.) manage the tail time associated with these data transfers to reduce the amount of tail time, desirably manage state transitions by the UE 102, and reduce use of wireless resources and power consumption by the UE 102.

In some implementations, when a visual image is to be transmitted to the UE 102 by the communication device 108, the UE communication management component 110 can transmit information relating to the UE 102 that can provide an indication of the dimensions of the screen size or other display screen characteristics associated with the UE 102 to the communication device 108. For example, the UE communication management component 110 can insert such information (e.g., display screen dimensions in pixels; information indicating make and model of communication device, device identifier, username of UE user, account or registration number associated with the UE 102 and/or associated UE user, etc., from which the communication management component 112 can derive the display screen dimensions of the UE 102; etc.) relating to the UE 102 in a header field associated with the request (e.g., a designated or special hypertext transfer protocol (HTTP) request header field) for the visual image. The communication management component 112 associated with the communication device 108 can analyze such information relating to the UE 102, and, based at least in part on the analysis results, can identify the screen dimensions and/or other display screen characteristics of the UE 102. The communication management component 112 can adjust resolution and/or other display characteristics of the visual image to correspond to the identified screen dimensions and/or other display characteristics of the UE 102. The communication device 108 can transmit the adjusted visual image and/or other associated content to the UE 102 for presentation (e.g., display) by the UE 102.

If the UE communication management component 110 determines that the transfer of the adjusted visual image is not time sensitive and can be scheduled as desired (e.g., delayed by a certain amount of time, if desired), or determines that there is another data transfer that can have its transfer time adjusted to be sent in a same data burst as the adjusted visual image, the UE communication management component 110 can schedule the data transfer of the adjusted visual image along with one or more other data transfers to group the transfer of the adjusted visual image and the other data transfer(s) (e.g., time-sensitive data transfer(s) or other data transfer(s) associated with a different application(s) or server(s)) in a single data burst to transfer these data transfers to the UE 102 via a communication channel (e.g., DCH) being utilized by the UE 102, instead of transferring these data transfers in multiple data bursts. The UE communication management component 110 also can utilize fast dormancy and/or the TOP protocol to desirably (e.g., acceptably, optimally, etc.) manage the tail time associated with these data transfers to reduce the amount of tail time, desirably manage state transitions by the UE 102, and reduce use of wireless resources and power consumption by the UE 102.

Figure 2:
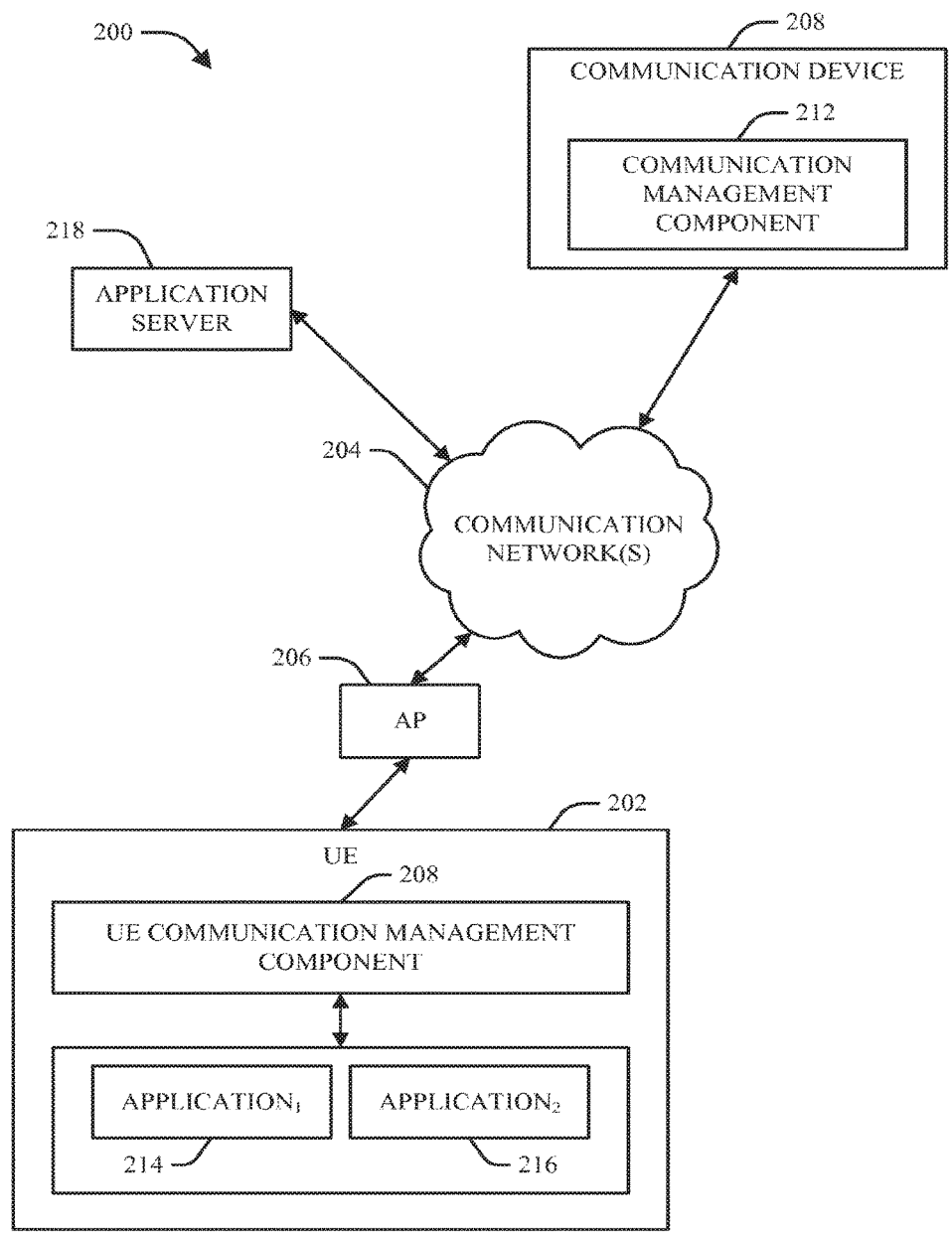
FIG. 2 depicts a block diagram of an example system that can desirably control scheduling of data transfers relating to user equipment (UE) in accordance with various aspects and embodiments described herein.

FIG. 2 depicts a block diagram of an example system 200 that can desirably control scheduling of data transfers relating to a UE in accordance with various aspects and embodiments described herein. The system 200 can include a UE 202 that can be communicatively connected to a communication network 204 via a communication connection with AP 206, which can be communicatively connected with the communication network 204. The system 200 also can include one or more other communication devices, including communication device 208 that can be communicatively connected to the communication network 204 via a wireline communication connection or wireless communication connection (e.g., cellular, Wi-Fi, or other type of wireless communication connection).

The UE 202 can include a UE communication management component 210 that can desirably (e.g., optimally, acceptably, etc.) control communication of data between the UE 202 and another communication device(s), such as communication device 208, as more fully disclosed herein. The communication device 208 can comprise a communication management component 212 that can coordinate with the UE communication management component 210 to desirably control communication of data between the UE 202 and the communication device 208 or another communication device(s). The UE 202, communication network 204, AP 206, communication device 208, UE communication management component 210, and communication management component 212 each can be the same as or similar to, or can comprise the same or similar functionality as, respective components (e.g., respectively named components), such as described herein with regard to the disclosed subject matter.

The UE 202 can contain, utilize, and/or be associated with a plurality of applications, including application$_1$ 214 and application$_2$ 216, that respectively can perform functions and/or provide services corresponding to the respective applications. For example, application$_1$ 214 can be an application that can facilitate providing news content to the UE 202, and application$_2$ 216 can be a media content application that can facilitate providing video and audio content to the UE 202. Application$_1$ 214 can be associated with an application server 218, which can be connected to the communication network 204 via a wireline or wireless communication connection, and can provide news content to the UE 202, as desired, for example, by the UE user. Application$_2$ 216 can be associated with the communication device 208, which can be a media content server that can provide video content, audio content, visual images, etc., to the UE 202, as desired, for example, by the UE user.

In accordance with various aspects, the UE communication management component 210 and communication management component 212 can coordinate with each other to determine whether streamed content can be delayed for a desired amount of time instead of being delivered to the UE 202 in real time, and transmitted from the communication device 208 to the UE 202 using a series of data bursts comprising respective portions of the content. The UE communication management component 210 and communication management component 212 also can coordinate with each other to control scheduling of the transmission of the data bursts of the portions of the content in relation to transmission of other data transfers (e.g., periodic and/or time-sensitive data transfers, or another type(s) of data transfer) to the UE 202 from the communication device 208 and/or the application server 218. For example, the UE communication management component 210 can schedule, or request to schedule, a transfer of a portion of content from the communication device 208 to have it bundled in a same data burst as a periodic data transfer being sent by the application server 218 to the UE 202. The communication management component 212 can facilitate transmitting the data transfer of the portion of content within the time interval of the data burst that includes the periodic data transfer from the application server 218 to the UE 202. This bundling of data transfers within a same data burst, instead of sending the data transfers separately in separate data bursts, can facilitate reducing the amount of radio resources used by the UE 202, the amount of power consumed by the UE, and the amount of resources used by the communication network 204, AP 206, and/or other components associated with the system 200. In some implementations, the UE communication management component 210 also can utilize fast dormancy and/or the TOP protocol to desirably (e.g., acceptably, optimally, etc) manage the tail time associated with these data transfers to reduce the amount of tail time, desirably manage state transitions by the UE 202, and reduce use of wireless resources and power consumption by the UE 202.

There are a number of different types of periodic transfers with which a bursty stream of content and/or a visual image (e.g., adjusted visual image) can be bundled into a single data burst. One type of periodic transfer can include a "keep alive" data transfer (e.g., comprising a "keep alive" data packet) that can be periodically sent by the UE 202 to maintain a communication connection on a communication channel. Another type of period data transfer can be a data transfer that relates to measurement of consumption or user tracking of consumption of an entity's content (e.g., in relation to an application), so that the entity can have information regarding how long the UE user has been viewing the entity's web page or viewing/listening to its video/audio content. Still another example of a periodic transfer is a logging data transfer, which can communicate logging information to a server (e.g., application server, such as application server 318), wherein the logging information can indicate what the UE user was consuming during the period of time to which the logging data transfer relates. Yet another example of a periodic data transfer can relate to advertisements that can be periodically communicated between an application server (e.g., application server 318, communication device 208 also can be an application server) and the UE 202, for example, when an application (e.g., application$_1$ 214, application$_2$ 216) is open. Another example of a periodic data transfer can be a pull data transfer relating to an application, wherein the pull data transfer can be periodically transmitted by the UE 202 to an application server to see if information is available or to try to obtain information from the application server. There are other types of periodic data transfers that are not included herein for reasons of brevity, however, all types of periodic data transfers are contemplated by and are considered part of the subject specification.

The periodic data transfers are data transfers that are communicated between the UE 202 and the communication network 204 (and/or servers, such as application servers (e.g., 318), communicatively connected to the communication network 204) on a periodic time basis, for example, while an application (e.g., application$_1$ 214, application$_2$ 216) is opened on and/or by the UE 202. Periodicity is a term that means or relates to the period or amount of time between two periodic data transfers (e.g., associated with an application), and a periodicity parameter can be one type of data transfer parameter for an application. For example, one application (e.g., application$_1$ 214) can have a periodic data transfer that has a periodicity of 5 minutes, wherein, except as otherwise specified by other data transfer parameters (e.g., jitter), the application requests that a data transfer occur every 5 minutes, while another application (e.g., application$_2$ 216) can have a periodicity of 30 minutes, wherein this other application requests that a data transfer occur every 30 minutes. In an aspect, if it is desired to have a one-time data transfer, the periodicity parameter of the data transfer can be set to 0 seconds, and as a result, the data transfer will be executed one time in accordance with the other data transfer parameters (e.g., transfer start time parameter).

In another aspect, to facilitate improving operations relating to data transfers by the UE 202, it can be desirable to specify a longer periodicity time as opposed to a shorter periodicity time, as the longer periodicity time can result in less periodic data transfers associated with an application, which can result in less data bursts associated with data transfers associated with an application. The time length of the periodicity can be set in accordance with the defined traffic communication criterion(s), and, for example, can be set by the application developer and/or updated and modified via an application update.

Another type of data transfer parameter can be a jitter parameter. The jitter parameter can specify the amount of time before and/or after the nominal transfer start time, which can be based at least in part on the periodicity parameter, the data transfer can be communicated. This is essentially the amount of leeway (e.g., the margin of deviation) from the scheduled time (e.g., nominal transfer start time) the application is able to accept in relation to communication of the data transfer. For instance, if a data transfer associated with an application has a nominal transfer start time at time $t_0$, and the jitter parameter is +/−30 seconds, the data transfer can occur at any time from $t_0$−30 seconds through $t_0$+30 seconds.

In yet another aspect, to facilitate improving operations relating to data transfers by the UE 202, it can be desirable to specify a longer jitter time as opposed to a shorter jitter time, as the longer jitter time can result in the UE communication management component 210 having more flexibility in scheduling data transfers that have a longer jitter time, which can result in more opportunities to bundle data transfers together and consequently result in less data bursts associated with data transfers. The time length of the jitter parameter can be set in accordance with the defined traffic communication criterion(s), and, for example, can be set by the application developer and/or updated and modified via an application update.

Still another type of data transfer parameter can be a transfer start time parameter (also referred to herein as "transferstarttime"). The transfer start time parameter can specify a time, $t_0$, that can be the desired or nominal start time to perform the data transfer. The transfer start time parameter can be based at least in part on the periodicity parameter. For example, if the periodicity parameter is set to 5 minutes, and the last data transfer relating to the application was performed at $t_0$−5 minutes, the transfer start time parameter can be set to $t_0$.

Yet another type of data transfer parameter can be a call back parameter (also referred to herein as "callback"). The call back parameter can be set to a value (e g, name, alphanumeric value) of a function that is desired to be called and/or executed in relation to the data transfer. Some examples of functions include a "keep alive" function that can be called or executed to facilitate performing a "keep alive" data transfer to maintain a communication connection, or an advertisement function that can be called periodically to facilitate performing a data transfer relating to advertisements.

In an aspect, when a first data transfer, which can be a periodic data transfer or one-time data transfer, associated with an application (e.g., application$_2$ 216) is to be scheduled for transmission by the UE communication management component 210 (e.g., based at least in part on the periodicity of that application), the UE communication management component 210 can analyze data transfer parameters (e.g., a jitter parameter, a periodicity parameter, and/or a transfer start time parameter) associated with the first data transfer, and also can analyze respective data transfer parameters of one or more other data transfers respectively associated with one or more other applications (e.g., application$_1$ 214) in relation to the data transfer parameters associated with the first data transfer to determine whether any of the one or more other data transfers can be transmitted during the same data burst as the first data transfer to mitigate (e.g., reduce, minimize) the number of data bursts communicated to send all of these data transfers analyzed by the UE communication management component 210 and/or mitigate the number or type of communication state transitions associated with the UE 202 in performing such data transfers. Depending in part on the type of data transfer (e.g., periodic, aperiodic), the other data transfers can be associated with the same type or different types of data transfer parameters as the first data transfer. For example, for an aperiodic data transfer (e.g., audio content), there can be a transfer start time, which can be the time the aperiodic data transfer is to be performed, but no jitter parameter (or a jitter parameter equal to 0 seconds), to indicate that the aperiodic data transfer is to be performed at the transfer start time.

In an aspect, to facilitate identifying respective data transfer parameters and bundling of data transfers, the system 200 can employ a desired data transfer Application Programming Interface (API) that can identify or specify the data transfer parameters associated with an application(s). The data transfer API can be initialized by an application (e.g., application$_1$ 214, application$_2$ 216,) and can be called, for example, when the application is opened up (e.g., activated) on the UE 202. The data transfer API also can specify a periodicity parameter to indicate the periodic times (e.g., every 5 minutes) that the data transfer API is to be run and an associated specified data transfer is to be executed. The data transfer API can be installed on the UE 202 when the associated application (e.g., application$_1$ 214, application$_2$ 216,) is installed on the UE 202, or at another desired time, and can be updated and modified (e.g., modified to add or change data transfer parameters, modified to add or change functions), as desired. The UE communication management component 210 can utilize the data transfer APIs of respective applications to facilitate identifying the data transfer parameters associated with respective data transfers associated with the applications, and facilitate controlling the scheduling and bundling of data transfers, in accordance with the defined traffic communication criterion(s).

In some implementations, the data transfer API can be RegPeriodicTolerantTransfer(periodicity, transferstarttime, callback, jitter), wherein such data transfer API can be used to register periodic tolerant transfers of data in accordance with the data transfer parameters, including periodicity parameter, transfer start time parameter, call back parameter, and jitter parameter, contained in RegPeriodicTolerantTransfer(periodicity, transferstarttime, callback, jitter). It is to be appreciated that RegPeriodicTolerantTransfer(periodicity, transferstarttime, callback, jitter) is but one example of a data transfer API, and, in accordance with other implementations, other types of data transfer APIs (e.g., having different data transfer parameters, having a different data transfer API name, etc.) can be utilized in accordance with the disclosed subject matter, and all such data transfer APIs are contemplated by and are part of the disclosed subject matter.

The UE communication management component 210 can employ fast dormancy and TOP to efficiently manage the tail time (e.g., reduce tail time) associated with these four data transfers, as disclosed herein. The tail time can be an amount of time that network radio resources can continue to be allocated to the UE 202, for instance, to have the UE 202 remain in a higher communication state (e.g., DCH state) in case there is going to be further communication of data between the UE 202 and the communication network 204. One purpose of the tail time is to facilitate controlling (e.g., to mitigate) the number of state transitions of the UE 202 due to the overhead incurred by the communication network 204 and UE 202 each time there is a state transition by the UE 202. However, as the UE 202 is continuing to utilize network radio resources during the tail time, it can be desirable for the UE 202 to actively release the network radio resources, using fast dormancy, to signal the communication network 204 (e.g., to signal a radio network controller (RNC) associated with the communication network 204) to transition the UE 202 from the high power active communication state to the idle state, wherein in the idle state, there will be no network radio resources allocated to the UE 202, and the UE 202 will consume little or no power in relation to the association of UE 202 with the communication network 204.

The system 200 and its respective components and/or other associated entities can implement TOP, which is an application-layer protocol that can bridge the gap between applications and fast dormancy support provided by the communication network 204. In accordance with one aspect, TOP can be implemented at UE 202 via modifications to the OS (e.g., software update) and/or associated applications, taking into account the implication of multiple concurrent communication connections and/or multiple concurrent communications using fast dormancy.

In some implementations, with regard to managing a data burst comprising one or more data transfers, the UE communication management component 210 can identify that no other communication is expected over a certain period of time. Based at least in part on this analysis, the UE communication management component 210 can determine that the tail time after a particular data transfer (as part of the data burst) is unnecessary since there are no communications expected by the UE 202 during the tail time. As a result, in accordance with TOP, the UE communication management component 210 can determine that fast dormancy is to be implemented. Accordingly, the UE communication management component 210 can generate a tail termination signal and can transmit the tail termination signal to the communication network 204 (e.g., to the RNC associated with the communication network 204), and the communication network 204 can terminate the tail by immediately transitioning the UE 202 from the high power active communication state to the idle state, wherein in the idle state the UE 202 will no longer have network radio resources allocated to it by the communication network 204, until another data communication is desired and resources are again allocated. The system 200, by employing fast dormancy in accordance with TOP, can thereby further reduce the use (e.g., unnecessary use) of network radio resources by the UE 202, which can reduce power consumption by the UE 202 and also can free up network radio resources for other UEs associated with the communication network 204.

Figure 3:
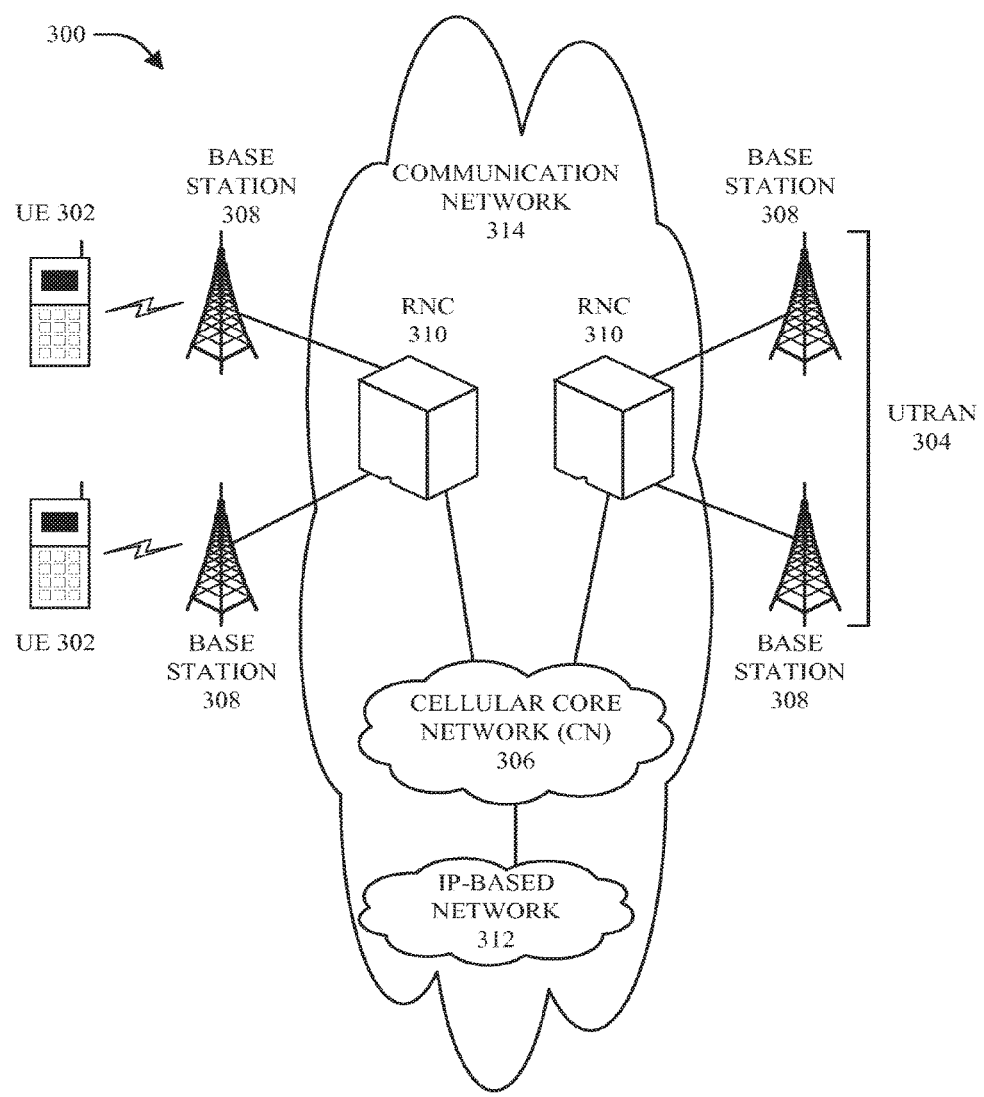
FIG. 3 illustrates a diagram of an example Universal Mobile Telecommunications System (UMTS) network that can facilitate desired operation of a UE in accordance with various aspects and embodiments.

Referring briefly to FIG. 3, illustrated is a diagram of an example UMTS network 300 that can facilitate desired operation of a UE in accordance with various aspects and embodiments. The UMTS network 300 can be employed to facilitate the scheduling and/or bundling of data transfers associated with communication devices (e.g., UEs), the implementation of fast dormancy and TOP, and/or other techniques for managing operations of a UE (e.g., the operating state of a UE) in a communication network environment.

As illustrated by FIG. 3, the UMTS network 300 can include three subsystems: UEs 302, the UMTS Terrestrial Radio Access Network (UTRAN) 304, and the Core Network (CN) 306. As used in UMTS network 300, UEs 302 can be mobile handsets that interact with end users, and/or any other suitable device(s). In one example, UTRAN 304 can enable connectivity between UE 302 and CN 306. UTRAN 304 can include two components: base stations 308, and Radio Network Controllers (RNCs) 310, which provide control functionalities for multiple base stations 308. In one example, a substantial number of the features of UTRAN 304 (e.g., packet scheduling, radio resource control, handover control, etc.) can be implemented at the RNC 310. In another example, the centralized CN 306 can be regarded as the backbone of the cellular network and can serve as an interface to other networks, such as an Internet Protocol (IP)-based network 312 (e.g., Internet), wherein the CN 306 and IP-based network 312 can be part of a communication network 314.

Returning briefly to FIG. 1 and FIG. 2 in the context of UMTS network 300, the term "radio resource" as used herein can refer to the Wideband CDMA (WCDMA) code space, the UTRAN transmission power, and/or other factors that are potential bottlenecks of the network. To efficiently utilize the limited radio resources, the UMTS radio resource control (RRC) protocol can introduce a state machine associated with each UE (e.g., UE 102, UE 302). By way of example, the RRC state machine can utilize three RRC states—IDLE, CELL_FACH, and CELL_DCH, as shown by diagrams 402 and 404 in FIG. 4.

Figure 4:
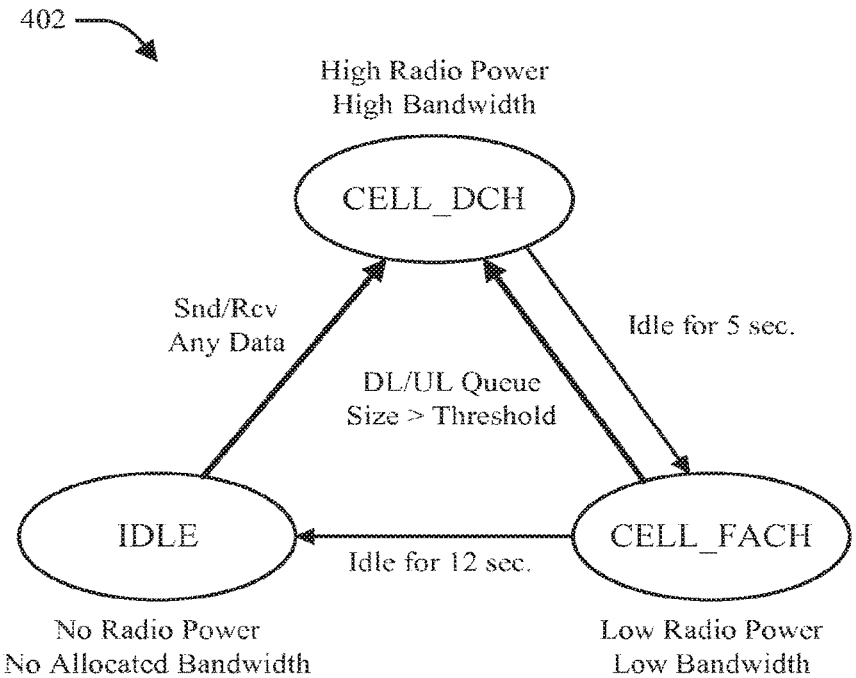
FIG. 4 illustrates diagrams of example state transition schemes that can be utilized by a wireless terminal in accordance with various aspects.
Figure 4:
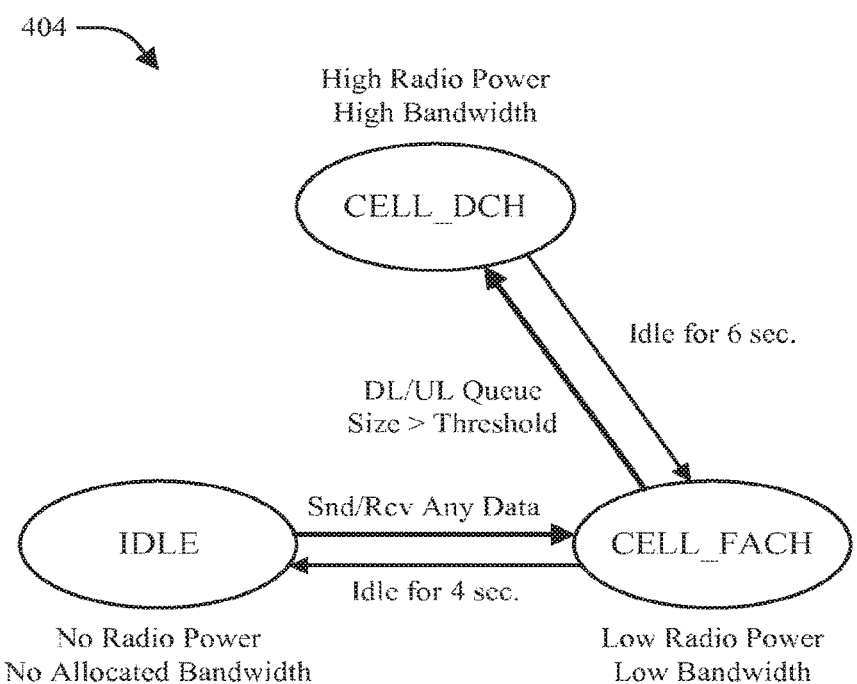

Referring to FIG. 4, as shown in diagrams 402 and 404, IDLE can be the default state of the UE when the UE is turned on. In this state, the UE (e.g., 102, 202, 302) has not established an RRC connection with the RNC; thus, no radio resource is allocated and the UE cannot transfer any data.

In the CELL_DCH state (also referred to herein as a "high power active communication state" or "DCH state"), the RRC connection is established and a UE (e.g., 102, 202, 302) can be allocated dedicated DCH transport channels in both DL, e.g., RNC to UE, and UL, e.g., UE to RNC. The DCH state can allow the UE to fully utilize the radio resources for user data transmission. In one example, when a large number of UEs are in the DCH state, the radio resources can in some cases be exhausted due to the lack of channelization codes in the cell. As a result, some UEs may be required to use low-speed shared channels, although in such a case their RRC states can remain at the DCH state.

In the CELL_FACH state (also referred to herein as a "low power active communication state", or "FACH state"), the RRC connection is established but there is no dedicated channel allocated to the UE (e.g., 102, 202, 302). Instead, the UE (e.g., 102, 202, 302) can only transmit user data through shared low-speed channels (e.g., less than 20 kbps). The FACH can be utilized and designed for applications requiring very low data throughput rate.

In accordance with one aspect, the various RRC states (also referred to herein as communication states or transition states) can impact the radio energy consumption of a UE (e.g., 102, 202, 302). For example, as shown by diagrams 402 and 404, a UE (e.g., 102, 202, 302) at the IDLE state can consume almost no energy from its wireless network interface. While a device (e.g., UE) operates within the same state, the radio power can be substantially stable regardless of the data throughput. In one example, the RRC state machine can be maintained at both the UE and the RNC. In such a case, the two peer entities can be synchronized via control channels except, e.g., during transient and error situations. In another example, both the DL and the UL can utilize the same state machine.

According to another aspect, there can be two types of RRC state transitions. State promotions, including IDLE state to FACH state, IDLE state to DCH state, and FACH state to DCH state, wherein an RNC can switch or transition an associated UE from a state with lower radio resources and UE energy utilization to another state (e.g., higher communication state) consuming more resources and UE energy. Conversely, state demotions, including DCH state to FACH state, FACH state to IDLE state, and DCH state to IDLE state, proceed in the reverse direction to demote the communication state of the UE and cause the UE to utilize less resources and consume less power. Depending on the starting state, a state promotion can be triggered by differing means. For example, if the UE (e.g., 102, 202, 302) is at the IDLE state, a state promotion can be triggered by either any user data (as opposed to control data) transmission activity. If the UE (e.g., 102, 202, 302) is at the FACH state, a state promotion can be triggered by the per-UE queue size, called the Radio Link Controller (RLC) buffer size, exceeding a defined size threshold in either direction, for example.

In another example, state demotions can be triggered by inactivity timers maintained by the RNC. For example, a timer controlling demotion from the DCH state to the FACH state is referred to herein as $\alpha$, and a timer controlling FACH state to IDLE state demotions is referred to herein as $\beta$. At the DCH state, the RNC can reset the $\alpha$ timer to a fixed threshold T whenever it observes any UL/DL data frame. Accordingly, if there is no user data transmission for T seconds, the $\alpha$ timer times out and the communication state of the UE can be demoted from the DCH state to the FACH state. A similar scheme can be used for the $\beta$ timer. As shown by diagrams 402 and 404, the threshold T assigned to timers $\alpha$ and $\beta$ can depend in part on implementation. For example, diagram 402 illustrates a system with $\alpha$ set to 5 seconds (also referred to herein as "sec" or "s") and $\beta$ set to 12 seconds, while diagram 404 illustrates a system with $\alpha$ set to 6 seconds and $\beta$ set to 4 seconds.

It can be appreciated that state promotions can involve more work than state demotions for both the UE and RNC. In particular, state promotions can incur a long "ramp-up" latency of up to 2 seconds, during which tens of control messages are exchanged between a UE and RNC for resource allocation. Excessive state promotions can thus increase the processing overhead at the RNC and degrade user experience, especially for short data transfers.

Diagrams 402 and 404 in FIG. 4 depict state transition diagrams for respective UMTS carriers, herein denoted "Carrier 1" and "Carrier 2," whose state machine parameters (under good signal strength conditions) are listed in Table I below. In accordance with one aspect, such data and/or other information collected via system analysis can be utilized to characterize the tail effect of a system.

TABLE I

Inferred state machine parameters for two example carriers.

|  | Carrier 1 | Carrier 2 |
|---|---|---|
| Inactivity timer | | |
| α: DCH to FACH | 5 sec | 6 sec |
| β: FACH to IDLE | 12 sec | 4 sec |
| Promotion time | | |
| IDLE to FACH | N/A | 0.6 sec |
| IDLE to DCH | 2 sec | N/A |
| FACH to DCH | 1.5 sec | 1.3 sec |
| RLC Buffer threshold | | |
| FACH to DCH (UL) | 543 ± 25 B | 151 ± 14 B |
| FACH to DCH (DL) | 475 ± 23 B | 119 ± 17 B |
| State radio power | | |
| DCH/FACH/IDLE | 800/460/0 mW | 600/400/0 mW |
| Promotion radio power | | |
| IDLE to FACH | N/A | 410 mW |
| IDLE to DCH | 550 mW | N/A |
| FACH to DCH | 700 mW | 480 mW |

Figure 5:
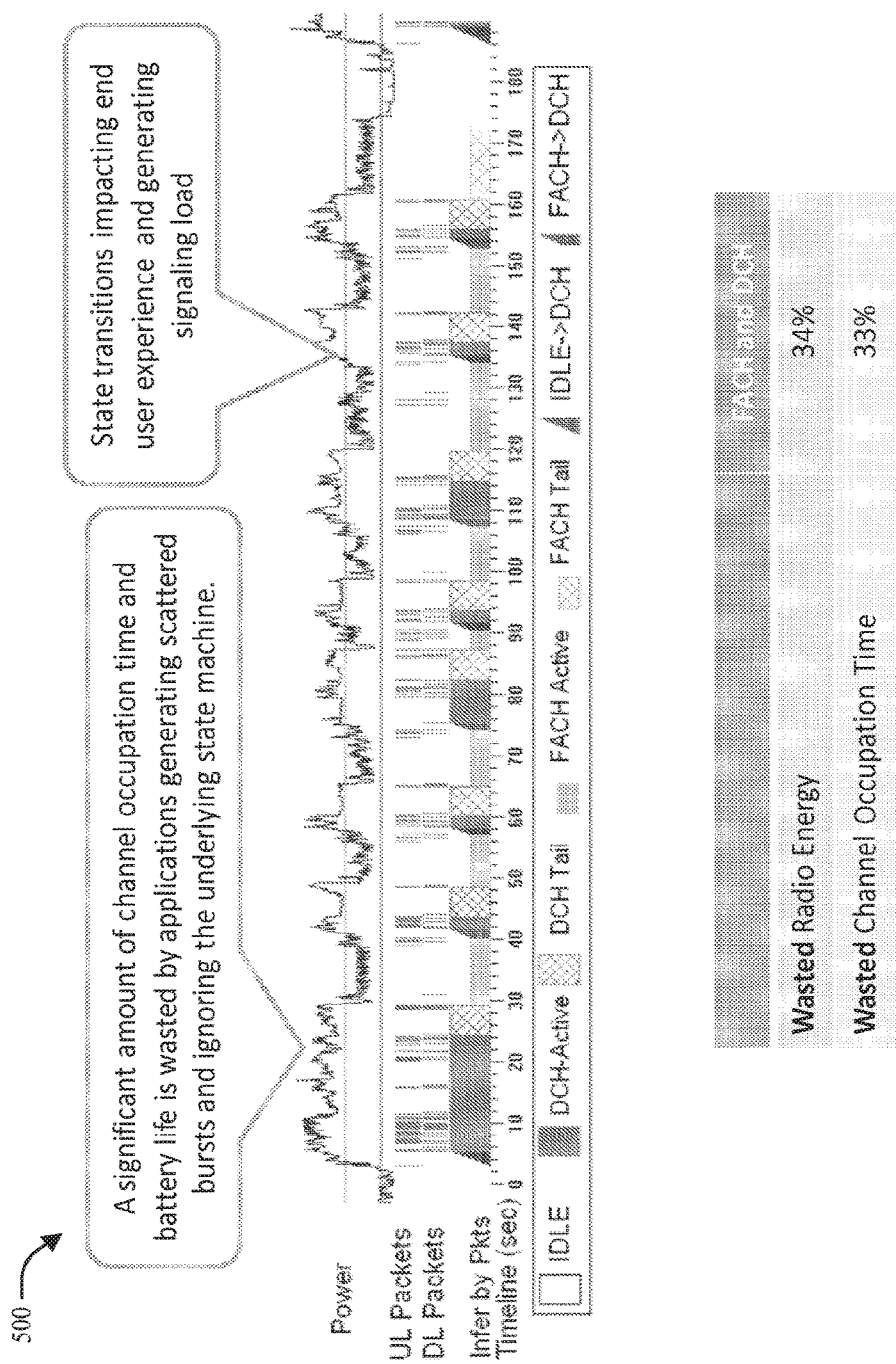
FIG. 5 depicts a diagram of example analysis results showing inefficiencies in resource utilization relating to a conventional wireless communication system.

FIG. 5 depicts a diagram of example analysis results 500 showing inefficiencies in resource utilization relating to a conventional wireless communication system. As can be seen in the example analysis results 500, a significant amount of channel occupation time and battery life associated with a conventional UE is wasted by applications generating many scattered data bursts and ignoring the underlying state machine (e.g., RRC state machine). The analysis results 500 also illustrate how communication state transitions can negatively impact end user experience and generate signaling load. The analysis results 500 indicate that the percentage of wasted energy involving FACH and DCH for the UE was 34% and the percentage of wasted channel occupation time for the UE in relation to FACH and DCH was 33%.

The disclosed subject matter, by controlling the scheduling of data transfers (e.g., delaying or advancing the scheduling of data transfers) and/or bundling or batching of data transfers (e.g., bundling data transfers with other more time-sensitive data transfers) into single data bursts, and/or employing fast dormancy in accordance with TOP, in accordance with the defined traffic communication criterion(s), can facilitate reducing the amount of power consumed by the UE and the amount of network radio resources used by the UE, the amount of wasted radio energy, and the amount of wasted channel occupation time with regard to data transfers.

Figure 6:
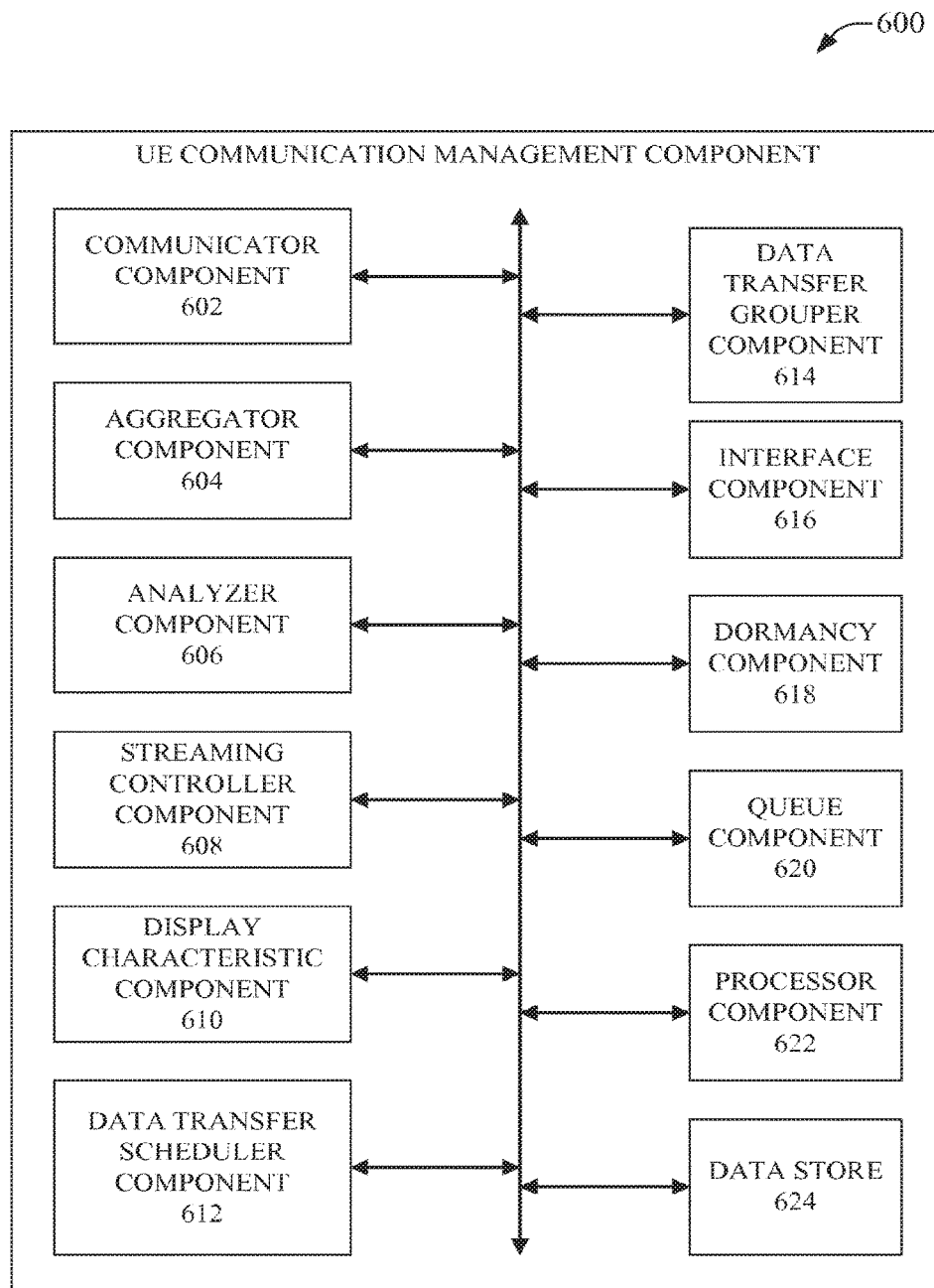
FIG. 6 illustrates a block diagram of an example UE communication management component in accordance with various aspects and embodiments of the disclosed subject matter.

FIG. 6 illustrates a block diagram of an example UE communication management component 600 in accordance with various aspects and embodiments of the disclosed subject matter. The UE communication management component 600 can include a communicator component 602 that can communicate (e.g., transmit, receive) information between the UE communication management component 600 and other components (e.g., communication device(s), communication network(s), processor component(s), user interface(s), data store(s), etc.). The information can include, for example, data transfers that can comprise content (e.g., video, audio, multimedia, and/or textual content), control information, a tail termination indicator (e.g., tail termination signal) to facilitate terminating a tail to transition the UE from a high power active communication state to a lower communication state (e.g., the idle state), etc. The UE communication management component 600 can use some of this information to facilitate controlling communication of data between the UE and the communication network and/or other communication devices, controlling the communication state of the UE, etc. The communicator component 602 can establish one or more communication connections to enable the UE communication management component 600 or associated UE to transmit data to or receive data from other communication devices in the communication network environment. The communicator component 602 can communicate data via a wireline or wireless communication connection or channel.

The UE communication management component 600 also can comprise an aggregator component 604 that can aggregate data received (e.g., obtained) from various entities (e.g., communication device(s), communication network(s), processor component(s), user interface(s), data store(s), etc.). The aggregator component 604 can correlate respective items of data based at least in part on type of data, source of the data, time or date the data was generated or received, etc., to facilitate processing of the data by other components of the UE communication management component 600.

The UE communication management component 600 can include an analyzer component 606 that can analyze information, including information relating to streaming (e.g., bursty streaming) of data, data transfer parameters, data transfer requests, application related information, one or more defined traffic communication criterion (e.g., and corresponding defined traffic communication rule(s)), etc., to facilitate the making of various identifications, determinations, decisions, etc., by components of the UE communication management component 600. Respective components of the UE communication management component 600 use the analysis results to facilitate identifying, determining, or deciding whether streamed data is to be sent via a number of data bursts instead of being streamed constantly at a constant bitrate, whether information indicative of the display screen size of the UE is to be communicated to another communication device (e.g., application server) in relation to downloading content (e.g., visual image, video content), when to schedule a data transfer, whether a data transfer can be bundled with another data transfer(s), whether fast dormancy is to be utilized to manage tail time, etc.

The UE communication management component 600 also can comprise a streaming controller component 608 that can identify, determine, or decide whether streamed data (e.g., video or audio content) can or is to be sent to the UE from the source (e.g., application server) via a number of data bursts (e.g., a number of bursty streams) instead of the streamed data being continuously streamed at a constant bitrate to the UE, in accordance with one or more defined traffic communication criterion. The streaming controller component 608 can coordinate or negotiate with a communication device, such as an application server (e.g., a communication management component of the application server), to facilitate identifying or determining whether streamed data can or is to be sent to the UE from the communication device via a series of data bursts instead of the streamed data being continuously streamed at a constant bitrate to the UE.

The UE communication management component 600 can include a display characteristics component 610 that can communication information indicative of the display characteristics of the UE to a communication device in relation to a request for content (e.g., visual image, video content, etc.) to facilitate enabling the communication device to adjust the display characteristics of the content to correspond with the display characteristics of a display screen of the UE. For example, the display characteristics component 610 can facilitate including information indicative of the display characteristics of the UE in relation to (e.g., as part of) a request for content to a communication device. The display-characteristics-related information can include display screen dimensions or resolution, information indicating a make or model of the UE, a UE identifier, username of a UE user, account or registration number associated with the UE and/or associated UE user, etc. In some implementations, the display characteristics component 610 can facilitate including the display-characteristics-related information in a special or designated header in relation to the content request.

The UE communication management component 600 also can comprise a data transfer scheduler component 612 that can be employed to schedule data transfers associated with applications utilized by the UE. The data transfer scheduler component 612 can schedule a data transfer to be executed at its nominal transfer start time or at another desired time (e.g., a time before or after the nominal transfer start time), in accordance with data transfer parameters, comprising jitter information, associated with the data transfer. The scheduling of the data transfers can facilitate bundling a data transfer with another data transfer(s) into a single data burst to facilitate reducing the number of data bursts communicated between the UE and communication network.

The UE communication management component 600 can contain a data transfer grouper component 614 that can group or bundle a data transfer with one or more other data transfers into a single data burst when permitted in accordance with the respective data transfer parameters of the respective data transfers and the defined traffic communication criteria. The data transfer grouper component 614 can operate in conjunction with the data transfer scheduler component 612 to facilitate efficient scheduling and/or bundling of data transfers associated with the UE.

The UE communication management component 600 can contain an interface component 616 that can be utilized to facilitate interfacing with, interacting with, and/or utilizing a desired API, such as a data transfer API associated with an application or a tail removal API that can be employed as part of a fast dormancy operation in accordance with TOP, to facilitate identifying or obtaining information relating to, and/or facilitate performance of, a data transfer(s) or a dormancy operation. In another aspect, the UE communication management component 600 can comprise a dormancy component 618 that can employ fast dormancy in accordance with TOP to facilitate reducing the amount of tail time (e.g., unnecessary tail time) for the UE during communication operations by the UE, as more fully disclosed herein.

The UE communication management component 600 can contain a queue component 620 that can employ one or more queues, including a data transfer queue, wherein respective data packets associated with respective data transfers can be inserted in a specified order to facilitate communication of the data packets in accordance with the scheduling of data transfers, as specified by the data transfer scheduler component 612. The data transfer scheduler component 612 can operate in conjunction with the queue component 620 to insert, order, or re-order data packets in the desired order in the queue component 620, and retrieve data packets from the queue component 620 when its time for such data packets to be communicated. The queue component 620 also can include a data reception queue, wherein respective data packets associated with respective received data transfers can be inserted in a specified order to facilitate presentation of the data packets by the UE. The queue component 620 can insert, order, or re-order data packets in a desired order in the queue component 620, and can retrieve or enable the retrieval of data packets from the queue component 620 when its time for such data packets to be presented or provided by the UE.

In another aspect, the UE communication management component 600 can comprise a processor component 622 that can work in conjunction with the other components (e.g., communicator component 602, aggregator component 604, analyzer component 606, etc.) to facilitate performing the various functions of the UE communication management component 600. The processor component 622 can employ one or more processors, microprocessors, or controllers that can process data, such as information relating to streaming of data and/or data transfers associated with the UE, information relating to operations of the UE communication management component 600, and/or other information, etc., to facilitate operation of the UE communication management component 600, as more fully disclosed herein, and control data flow between the UE communication management component 600 and other components (e.g., communication network, base station, a server or other communication device, etc.) associated with the UE communication management component 600.

The UE communication management component 600 also can include a data store 624 that can store data structures (e.g., user data, metadata), code structure(s) (e.g., modules, objects, hashes, classes, procedures) or instructions, information relating to data transfers, information relating to operations of the UE communication management component 600, defined traffic communication criterion(s) (and corresponding defined traffic communication rule(s)), etc., to facilitate controlling operations associated with the UE communication management component 600. In an aspect, the processor component 622 can be functionally coupled (e.g., through a memory bus) to the data store 624 in order to store and retrieve information desired to operate and/or confer functionality, at least in part, to the communicator component 602, aggregator component 604, analyzer component 606, etc., and/or substantially any other operational aspects of the UE communication management component 600.

Figure 7:
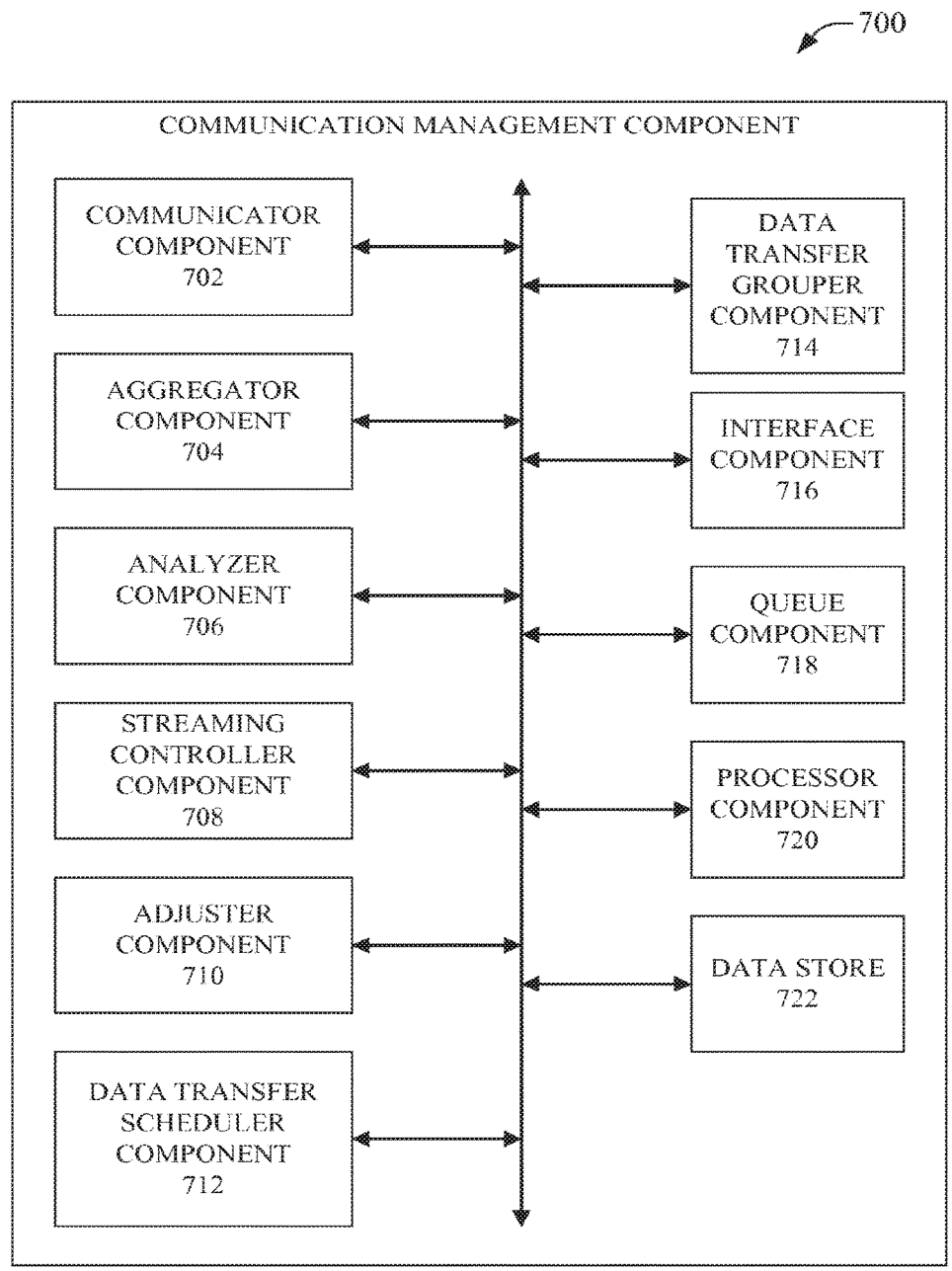
FIG. 7 presents a block diagram of an example communication management component in accordance with various aspects and embodiments of the disclosed subject matter.

FIG. 7 presents a block diagram of an example communication management component 700 in accordance with various aspects and embodiments of the disclosed subject matter. The communication management component 700 can include a communicator component 702 that can communicate (e.g., transmit, receive) information between the communication management component 700 and other components (e.g., UE(s) or other communication device(s), communication network(s), processor component(s), user interface(s), data store(s), etc.). The information can include, for example, data transfers that can comprise content (e.g., video, audio, multimedia, and/or textual content), control information, etc. The communication management component 700 can use some of this information to facilitate controlling communication of data between the communication device and the communication network and/or another communication device (e.g., UE), controlling the communication state of the communication device, etc. The communicator component 702 can establish one or more communication connections to enable the communication management component 700 or associated communication device to transmit data to or receive data from other communication devices in the communication network environment. The communicator component 702 can communicate data via a wireline or wireless communication connection or channel.

The communication management component 700 also can comprise an aggregator component 704 that can aggregate data for transmission to another entity (e.g., UE(s), communication network(s), processor component(s), user interface(s), data store(s), etc.) or received (e.g., obtained) from another entity. The aggregator component 704 can correlate respective items of data based at least in part on type of data, source of the data, piece of content to which data portions (e.g., bursty streams) relate, time or date the data was generated or received, etc., to facilitate processing of the data by other components of the communication management component 700 and/or transmission of data to another entity.

The communication management component 700 can contain an analyzer component 706 that can analyze information, including information relating to streaming (e.g., bursty streaming) of data, data transfer parameters, data transfer requests, application related information, one or more defined traffic communication criterion (e.g., and corresponding defined traffic communication rule(s)), etc., to facilitate the making of various identifications, determinations, decisions, etc., by components of the communication management component 700. Respective components of the communication management component 700 use the analysis results to facilitate identifying, determining, or deciding whether streamed data is to be sent via a number of data bursts instead of being streamed constantly at a constant bitrate, whether content (e.g., visual image, video content) is to be adjusted in size or with regard to other display characteristics in relation to communicating the content to a UE based at least in part on display-characteristics-related information received from the UE, when to schedule a data transfer, etc.

The communication management component 700 can comprise a streaming controller component 708 that can facilitate identifying, determining, or deciding whether streamed data (e.g., video or audio content) can or is to be sent to the UE from the communication device via a number of data bursts (e.g., a number of bursty streams) instead of the streamed data being continuously streamed at a constant bitrate to the UE, in accordance with one or more defined traffic communication criterion. The streaming controller component 708 can coordinate or negotiate with the UE (e.g., the UE communication management component of the UE), to facilitate identifying or determining whether streamed data can or is to be sent from the communication device to the UE via a series of data bursts instead of the streamed data being continuously streamed at a constant bitrate to the UE.

The communication management component 700 can include an adjuster component 710 that can receive information indicative of the display characteristics of the UE from the UE in relation to a request for content (e.g., visual image, video content, etc.). The display-characteristics-related information can include display screen dimensions or resolution of the UE, information indicating a make or model of the UE, a UE identifier, username of a UE user, account or registration number associated with the UE and/or associated UE user, etc. The adjuster component 710 can determine whether content is to have its display characteristics (e.g., dimensions of an image(s) or other visual characteristics of the image(s)) adjusted based at least in part on the received display-characteristics-related information. The communication device can efficiently transmit the content (e.g., adjusted content) to the UE such that the content, as transmitted by the communication device, can correspond with the display characteristics of the UE to facilitate presentation of the content by the UE such that the communication device reduces of minimizes the use of resources or bandwidth to communicate content that has different display characteristics than (e.g., is larger than) the display characteristics associated with the UE.

The communication management component 700 can comprise a data transfer scheduler component 712 that can be employed to schedule data transfers associated with the communication device and/or application(s) associated with the communication management component 700 and utilized by one or more UEs in a communication network environment. The data transfer scheduler component 712 can schedule a data transfer to be executed at a desired time (e.g., a time within the jitter time window associated with the data transfer), in accordance with data transfer parameters, comprising jitter information, associated with the data transfer. The scheduling of the data transfers can facilitate bundling a data transfer with another data transfer(s) into a single data burst to facilitate reducing the number of data bursts communicated between communication devices and the UE via the communication network.

The communication management component 700 also can include a data transfer grouper component 714 that can group or bundle a data transfer with another data transfer(s) into a single data burst, and/or schedule a data transfer(s) associated with the communication device to occur, when permitted in accordance with the data transfer parameters (e.g., jitter parameter) of the data transfer(s) and the defined traffic communication criteria. The data transfer grouper component 714 can operate in conjunction with the data transfer scheduler component 712 to facilitate efficient scheduling and/or bundling of data transfers to be sent to a UE. In some implementations, the communication management component 700 can contain an interface component 716 that can be utilized to facilitate interfacing with, interacting with, and/or utilizing a desired API, such as a data transfer API associated with an application, to facilitate identifying or obtaining information relating to, and/or facilitate performance of, a data transfer(s).

The communication management component 700 can include a queue component 718 that can employ one or more queues, including a data transfer queue, wherein respective data packets associated with respective data transfers can be inserted in a specified order to facilitate communication of the data packets in accordance with the scheduling of data transfers, as specified by the data transfer scheduler component 712. The queue component 718 can be and/or function as a buffer component to buffer the data transfers of respective portions of content being transmitted to the UE in bursty streams. The data transfer scheduler component 712 can operate in conjunction with the queue component 718 to insert, order, or re-order data packets in the desired order in the queue component 718, and retrieve data packets from the queue component 718 when its time for such data packets to be communicated (e.g., to the UE).

In another aspect, the communication management component 700 can comprise a processor component 720 that can work in conjunction with the other components (e.g., communicator component 702, aggregator component 704, analyzer component 706, etc.) to facilitate performing the various functions of the communication management component 700. The processor component 720 can employ one or more processors, microprocessors, or controllers that can process data, such as information relating to data transfers associated with one or more UEs, information relating to operations of the communication management component 700, and/or other information, etc., to facilitate operation of the communication management component 700, as more fully disclosed herein, and control data flow between the communication management component 700 and other components (e.g., communication network, base station, a server, UE, etc.) associated with the communication management component 700.

The communication management component 700 also can include a data store 722 that can store data structures (e.g., user data, metadata), code structure(s) (e.g., modules, objects, hashes, classes, procedures) or instructions, information relating to data transfers, information relating to operations of the communication management component 700, defined traffic communication criterion(s) (and a corresponding defined traffic communication rule(s)), etc., to facilitate controlling operations associated with the communication management component 700. In an aspect, the processor component 720 can be functionally coupled (e.g., through a memory bus) to the data store 722 in order to store and retrieve information desired to operate and/or confer functionality, at least in part, to the communicator component 702, aggregator component 704, analyzer component 706, etc., and/or substantially any other operational aspects of the communication management component 700.

Figure 8:
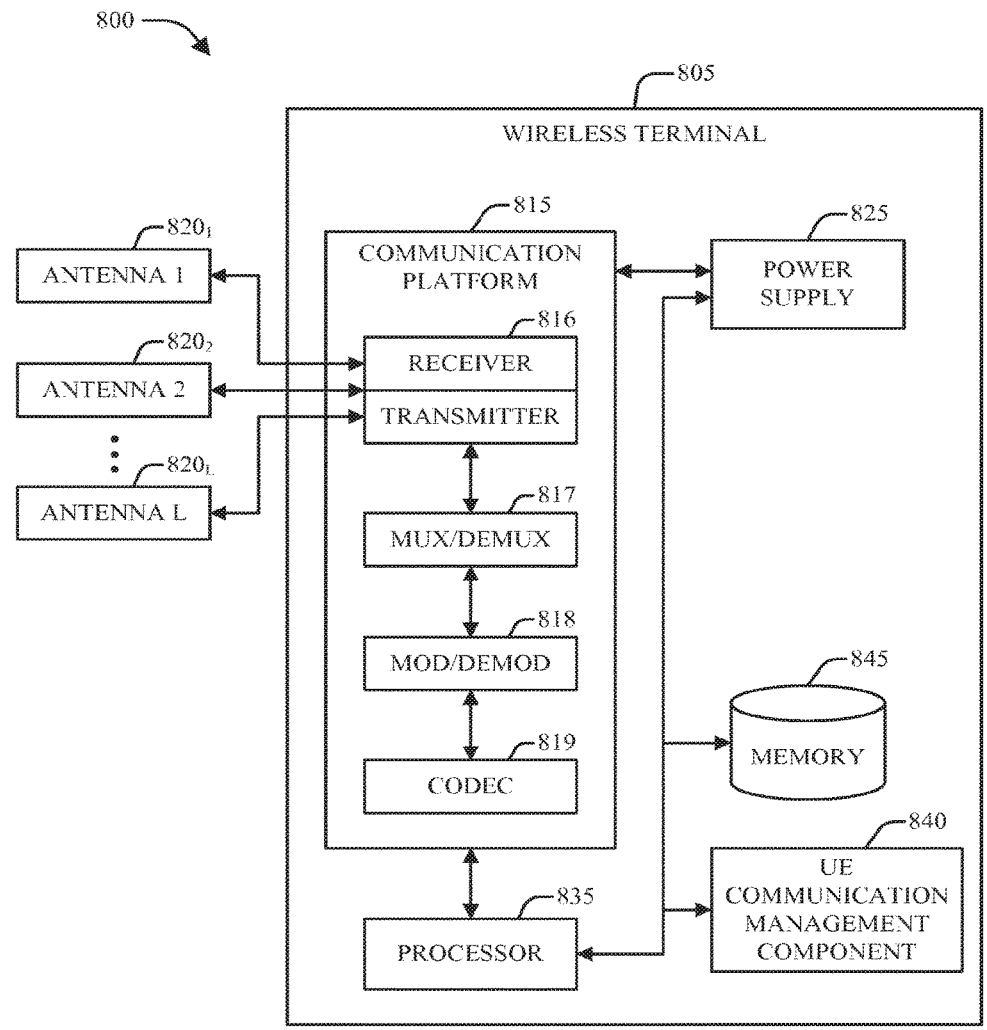
FIG. 8 illustrates a non-limiting example system that can implement some or all of the aspects described herein.

In order to provide further context for various aspects of the disclosed subject matter, FIG. 8 illustrates a non-limiting example system 800 that can implement some or all of the aspects described herein. As FIG. 8 illustrates, system 800 can include a wireless terminal 805 (e.g., UE). In some implementations, the wireless terminal 805 can receive and transmit signal(s) to and/or from wireless devices such as APs, access terminals, wireless ports and routers, or the like, through a set of L antennas 820. In one example, antennas 820 can be implemented as part of a communication platform 815, which in turn can comprise electronic components and associated circuitry and/or other means that provide for processing and manipulation of received signal(s) and signal(s) to be transmitted.

In an aspect, the communication platform 815 can include a receiver/transmitter or transceiver 816, which can transmit and receive signals and/or perform one or more processing operations on such signals (e.g., conversion from analog to digital upon reception, conversion from digital to analog upon transmission, etc.). In addition, transceiver 816 can divide a single data stream into multiple, parallel data streams, or perform the reciprocal operation.

In another example, a multiplexer/demultiplexer (mux/demux) unit 817 can be coupled to transceiver 816. Mux/demux unit 817 can, for example, facilitate manipulation of signal in time and frequency space. Additionally or alternatively, mux/demux unit 817 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 817 can scramble and spread information according to substantially any code known in the art, such as Hadamard-Walsh codes, Baker codes, Kasami codes, polyphase codes, and so on.

In a further example, a modulator/demodulator (mod/demod) unit 818 implemented within communication platform 815 can modulate information according to multiple modulation techniques, such as frequency modulation, amplitude modulation (e.g., L-ary quadrature amplitude modulation (L-QAM), etc.), phase-shift keying (PSK), and the like. Further, communication platform 815 can also include a coder/decoder (codec) module 819 that can facilitate coding information for transmission to another communication device, or decoding and/or reconstructing received information for presentation by the wireless terminal 805.

The wireless terminal 805 can include a processor 835 that can be configured to confer functionality, at least in part, to substantially any electronic component utilized by wireless terminal 805. As further shown in system 800, a power supply 825 can attach to a power grid and include one or more transformers to achieve a power level at which various components and/or circuitry associated with wireless terminal 805 can operate. The power supply 825 can include a rechargeable power mechanism to facilitate continued operation of wireless terminal 805 in the event that wireless terminal 805 is disconnected from the power grid, the power grid is not operating, etc.

In still another aspect, the wireless terminal 805 can include a UE communication management component 840 that can be associated with (e.g., functionally connected) to the processor 835. The UE communication management component 840 can be the same as or similar to, or can comprise the same or similar functionality as, similarly named components, as more fully disclosed herein.

In a further aspect, processor 835 can be functionally connected to communication platform 815 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 835 can be functionally connected, via a data or system bus, to any other components or circuitry not shown in system 800 to at least partially confer functionality to each of such components.

As additionally illustrated in system 800, a memory 845 (e.g., data store) can be used by wireless terminal 805 to store data structures, code instructions and program modules, system or device information, code sequences for scrambling, spreading and pilot transmission, location intelligence storage, determined delay offset(s), over-the-air propagation models, and so on. The memory also can store and/or provide content to facilitate presentation by the wireless terminal 805, display-characteristics-related information associated with the wireless terminal 805, defined traffic communication criterion(s) (and a corresponding traffic communication rule(s)), and/or other information. Processor 835 can be coupled to the memory 845 in order to store and retrieve information necessary to operate and/or confer functionality to communication platform 815 and/or any other components of wireless terminal 805.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. Also, while various components have been illustrated as separate components, it will be appreciated that multiple components can be implemented as a single component, or a single component can be implemented as multiple components, without departing from example embodiments. The components may also interact with one or more other components not specifically described herein for the sake of brevity, but known by those of skill in the art.

In view of the example systems, components, and devices described above, example methods that can be implemented in accordance with this disclosure can be further appreciated with reference to flowcharts in FIGS. 9-13. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

Figure 9:
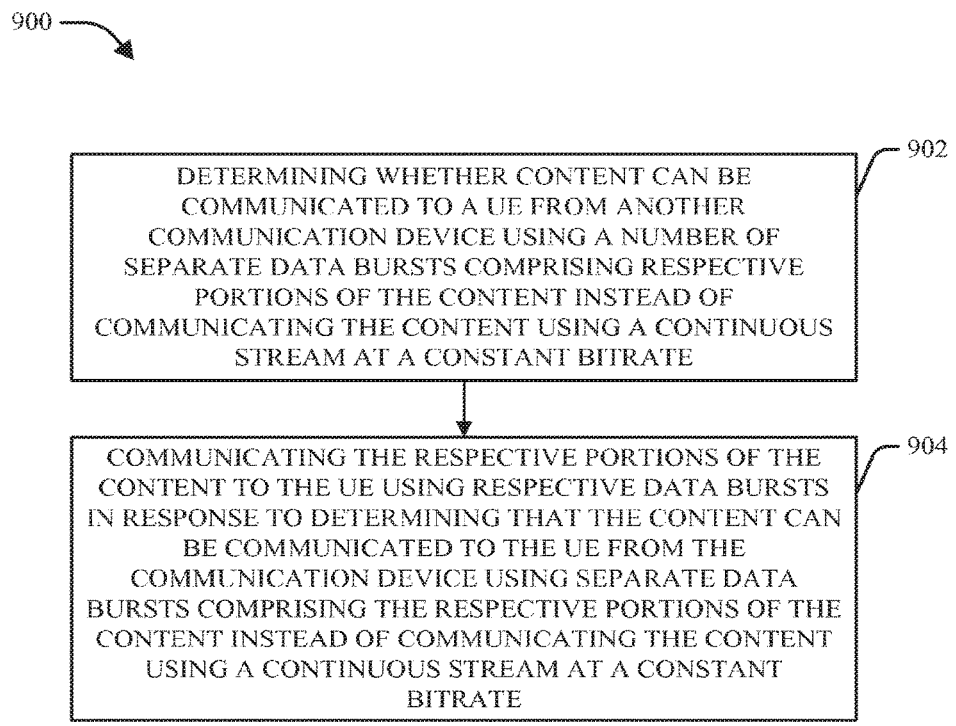
FIG. 9 depicts a flow chart of an example method for managing data transfers associated with a UE, in accordance with various aspects and embodiments.

FIG. 9 depicts a flow chart of an example method 900 for managing data transfers associated with a UE, in accordance with various aspects and embodiments. In accordance with various aspects, the method 900 can be utilized by a UE employing a UE communication management component, and/or can be utilized by a communication device employing a communication management component.

At 902, a determination can be made regarding whether content (e.g., video or audio content) can be communicated to a UE from another communication device using a number of respective (e.g., separate) data bursts comprising respective portions of the content instead of communicating the content using a continuous stream at a constant bitrate. The UE communication component of the UE and/or the communication management component of the communication device can determine whether it is acceptable (e.g., permissible, allowable, tolerable, etc.) to communicate the content to a UE from the communication device using a number of separate data bursts comprising respective portions of the content instead of communicating the content using a continuous stream at a constant bitrate based at least in part on the defined traffic communication criterion(s).

At 904, the respective portions of the content can be communicated to the UE using respective data bursts in response to determining that the content can be communicated to the UE from the communication device using separate data bursts comprising the respective portions of the content instead of communicating the content using a continuous stream at a constant bitrate. The UE communication component and/or the communication management component can respectively operate to facilitate having the communication device transmit the respective portions of the content to the UE using respective data bursts in response to determining that it is acceptable for the content to be communicated to the UE from the communication device using separate data bursts comprising the respective portions of the content instead of communicating the content using a continuous stream at a constant bitrate. In some implementations, the UE communication management component and/or communication management component can schedule a data transfer of a portion of the content to coincide with (e.g., be bundled with) one or more other data transfers of other content or information as part of a single data burst, as more fully disclosed herein. The UE communication management component also can employ fast dormancy and/or a TOP protocol to further improve the efficiency of communication of information associated with the UE, as more fully disclosed herein.

Figure 10:
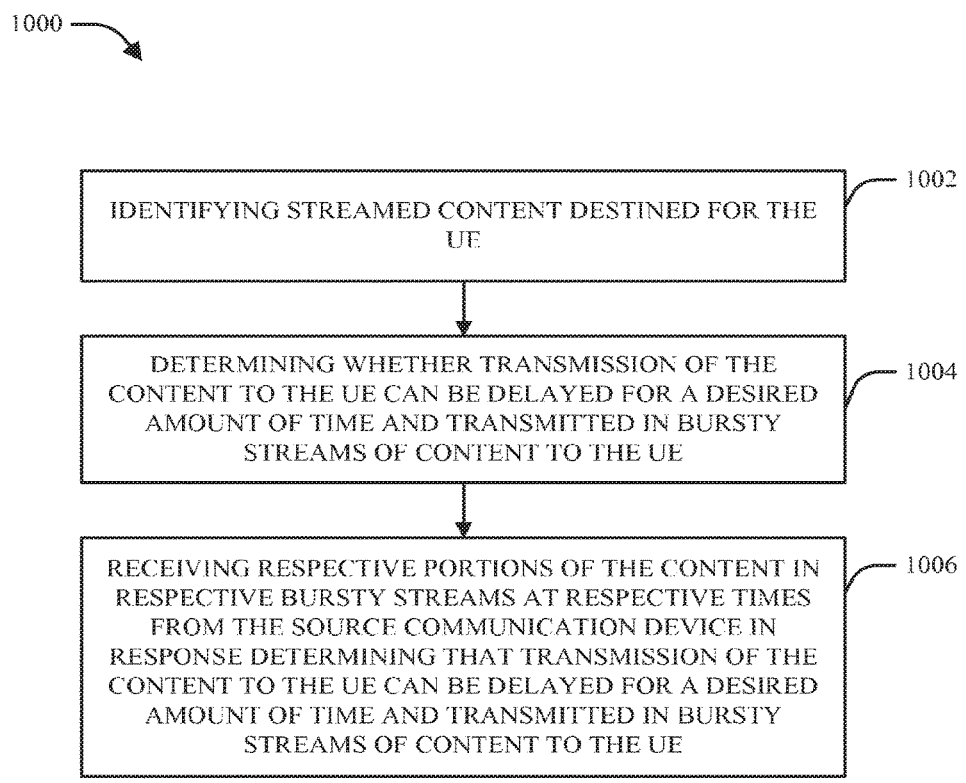
FIG. 10 depicts a flow chart of another example method for managing data transfers associated with a UE, in accordance with various aspects and embodiments.

Referring next to FIG. 10, depicted is a flow chart of an example method 1000 for managing data transfers associated with a UE, in accordance with various aspects and embodiments. In accordance with various aspects, the method 1000 can be utilized by a UE employing a UE communication management component in relation to receiving content from another communication device.

At 1002, streamed content (e.g., video, audio, or multimedia content) destined for the UE can be identified. Streamed content can be destined for delivery to the UE, for example, in response to a request by the UE to download the content from the communication device (e.g., application server). The UE communication management component can identify the streamed content as being, for example, content that can be continuously streamed to the UE at a constant bitrate. As more fully disclosed herein, streaming of content to a UE at a constant bitrate can result in radio and other resources of the UE and communication network being used inefficiently (e.g., the communication channel (e.g., DCH), which can be used to communicate the content, can be underutilized and/or unnecessarily utilized).

At 1004, a determination can be made regarding whether transmission of the content to the UE can be delayed for a desired amount of time and transmitted in bursty streams of content to the UE. The UE communication management component can negotiate with the communication management component of the source (e.g., sender) communication device regarding whether transmission of the content to the UE can be delayed for a desired amount of time and transmitted in bursty streams to the UE, wherein each of the bursty streams can include respective portions of the content.

At 1006, respective portions of the content can be received in respective bursty streams at respective (e.g., different) times (e.g., at regular or irregular time intervals) from the source communication device in response determining that transmission of the content to the UE can be delayed for a desired amount of time and transmitted in bursty streams of content to the UE. In response determining that transmission of the content to the UE can be delayed for a desired amount of time and transmitted in bursty streams of content to the UE, the source communication device can transmit the respective portions of content in the respective bursty streams at respective times, and the UE can receive the respective portions of the content in the respective bursty streams at those respective times.

In some implementations, the UE communication management component can schedule a data transfer of a respective portion of the content to have it bundled with one or more other data transfers associated with (e.g., destined for delivery to) the UE. For example, if the UE is able to receive a data transfer from a second source communication device (e.g., an application server) during a particular time interval, and the data transfer of the respective portion of content from the source communication device can be received during that particular time interval (e.g., without disruption of presentation of the content by the UE), the UE communication management component can schedule these data transfers to be delivered to the UE during a same data burst, instead of having them delivered to the UE in separate data bursts, wherein communicating the data transfers in the same data burst can be more efficient than communicating these data transfers in separate data bursts.

Figure 11:
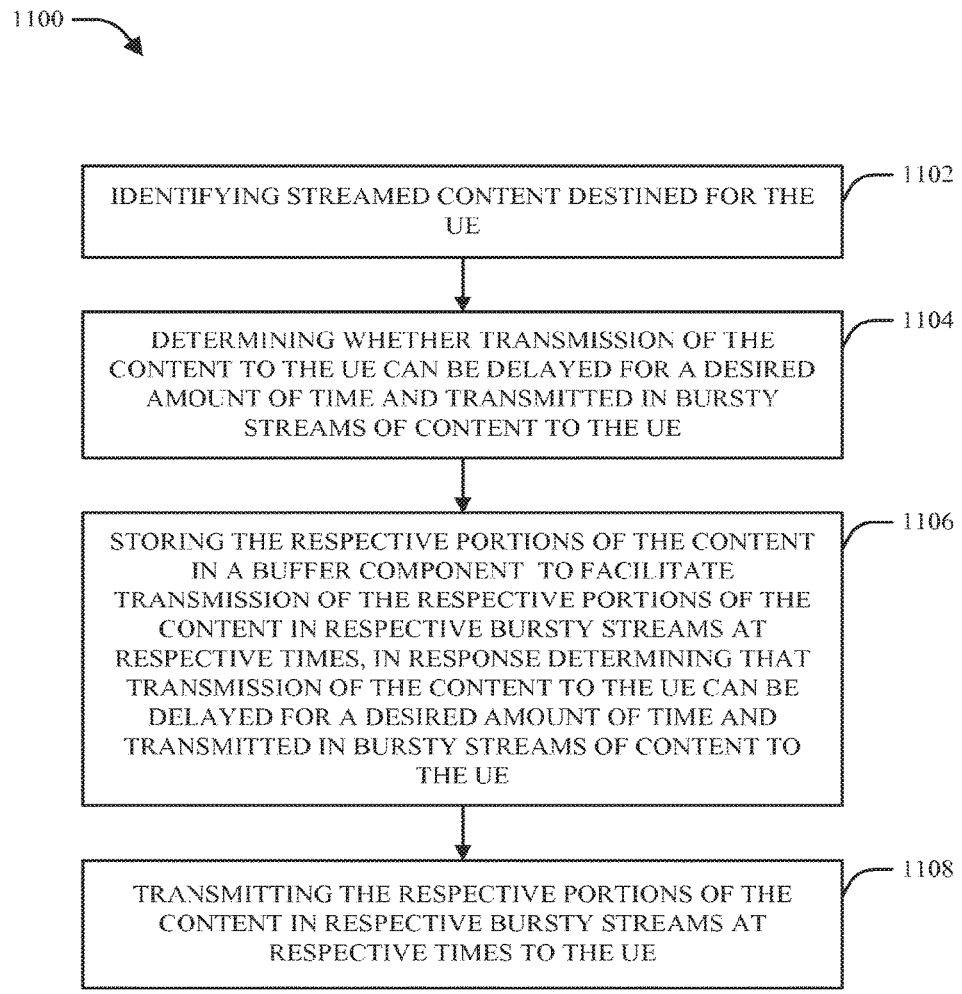
FIG. 11 depicts a flow chart of still another example method for managing data transfers associated with a UE, in accordance with various aspects and embodiments.

FIG. 11 depicts a flow chart of an example method 1100 for managing data transfers associated with a UE, in accordance with various aspects and embodiments. In accordance with various aspects, the method 1100 can be utilized by a communication device employing a communication management component in relation to transmitting content to the UE.

At 1102, streamed content (e.g., video, audio, or multimedia content) destined for the UE can be identified. Streamed content can be destined for delivery to the UE, for example, in response to a request by the UE to download the content from the communication device (e.g., application server). The communication management component can identify the streamed content as being, for example, content that can be continuously streamed to the UE at a constant bitrate by the communication device. As more fully disclosed herein, streaming of content to a UE at a constant bitrate can result in radio and other resources of the UE and communication network being used inefficiently (e.g., the communication channel (e.g., DCH)), which can be used to communicate the content, can be underutilized and/or unnecessarily utilized).

At 1104, a determination can be made regarding whether transmission of the content to the UE can be delayed for a desired amount of time and transmitted in bursty streams of content to the UE. The communication management component, associated with the communication device, can negotiate with the UE communication management component, associated with the UE, regarding whether transmission of the content to the UE can be delayed for a desired amount of time and transmitted in bursty streams to the UE, wherein each of the bursty streams can include respective portions of the content.

At 1106, respective portions of the content can be stored in a buffer component (e.g., queue and/or buffer component) to facilitate transmission of the respective portions of the content in respective bursty streams at respective times, in response determining that transmission of the content to the UE can be delayed for a desired amount of time and transmitted in bursty streams of content to the UE. In response to determining that transmission of the content to the UE can be delayed for a desired amount of time and transmitted in bursty streams of content to the UE, the communication management component can store a subset of the respective portions of the content in the buffer component for transmission of the respective portions of the content in subsequent data bursts, in accordance with the defined traffic communication criterion(s).

At 1108, the respective portions of the content can be transmitted in respective bursty streams at respective (e.g., different) times (e.g., at regular or irregular time intervals) to the UE. At respective times (e.g., as scheduled in coordination with the UE communication management component), the communication management component can facilitate transmitting the respective portions of the content in the respective bursty streams to the UE, and the UE can receive the respective portions of the content in the respective bursty streams at the respective times. In some implementations, the UE communication management component and the communication management component can coordinate with each other to schedule a data transfer of a respective portion of the content to have it bundled with one or more other data transfers associated with (e.g., destined for delivery to) the UE, as more fully disclosed herein.

Figure 12:
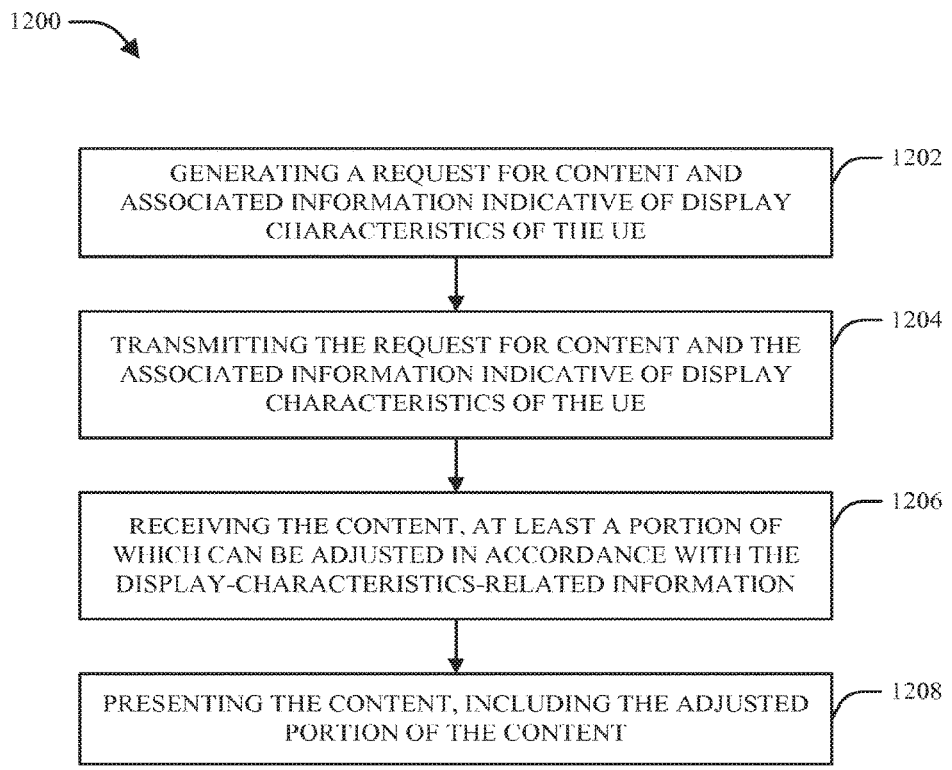
FIG. 12 illustrates a flow chart of an example method that can facilitate modifying display characteristics associated with content to facilitate efficient transmission of the content in accordance with various aspects and embodiments.

FIG. 12 illustrates a flow chart of an example method 1200 that can facilitate modifying display characteristics associated with content to facilitate efficient transmission of the content in accordance with various aspects and embodiments. As desired, the method 1200 can be employed, for example, by the UE (e.g., UE communication management component of the UE) in relation to communication of content between a communication device and the UE.

At 1202, a request for content and associated information indicative of display characteristics of the UE can be generated. The UE can generate a request for content (e.g., content including a visual image or video content). The UE communication management component can provide display-characteristics-related information in relation to (e.g., as part of) the request for content.

At 1204, the request for content and the associated information indicative of display characteristics of the UE can be transmitted, e.g., to the communication device that can provide the content. The UE and/or associated UE communication management component can facilitate transmitting the request for content and the associated information indicative of display characteristics of the UE to the communication device that can provide the content.

At 1206, the content, at least a portion of which can be adjusted in accordance with the display-characteristics-related information, can be received (e.g., by the UE). The UE can receive the content, including the adjusted portion, from the communication device. The communication device can adjust at least a portion (e.g., visual image(s) or video content) of the content to correspond to the display characteristics of the UE in accordance with the display-characteristics-related information associated with the UE, as provided to the communication device in relation to the content request.

At 1208, the content, including the adjusted portion of the content, can be presented. The UE can present the content, including the adjusted portion of the content, on a display screen of the UE.

Figure 13:
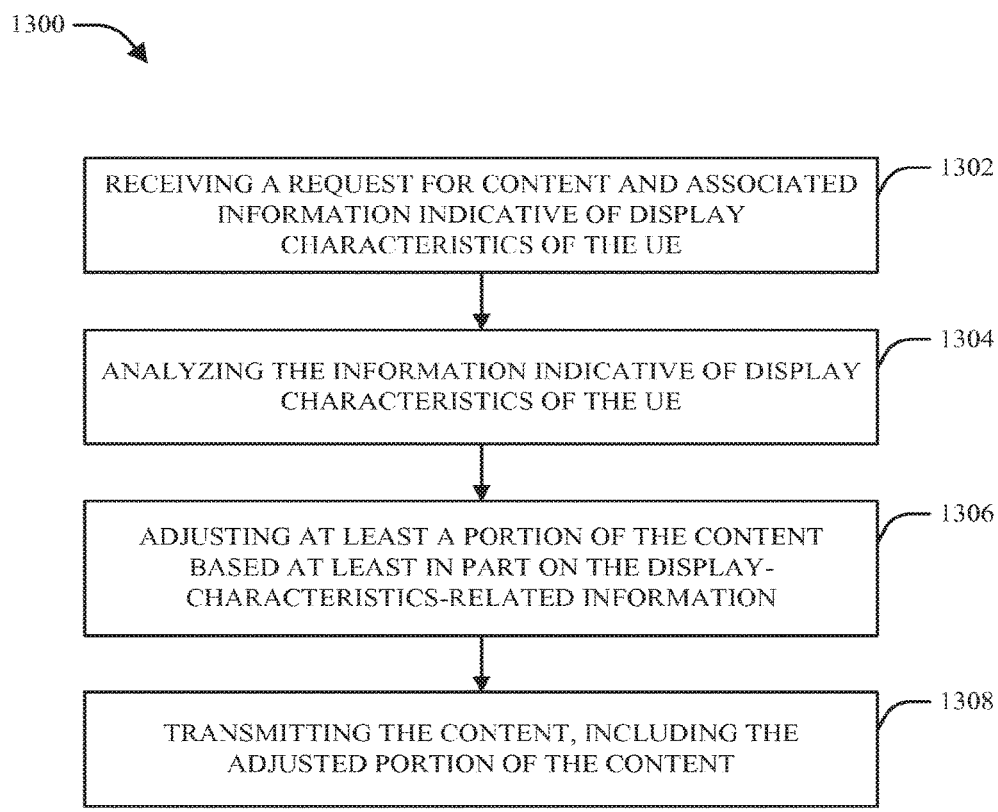
FIG. 13 depicts a flow chart of another example method that can facilitate modifying display characteristics associated with content to facilitate efficient transmission of the content in accordance with various aspects and embodiments.

FIG. 13 depicts a flow chart of another example method 1300 that can facilitate modifying display characteristics associated with content to facilitate efficient transmission of the content in accordance with various aspects and embodiments. As desired, the method 1300 can be employed, for example, by a communication device (e.g., communication management component of the communication device) in relation to communication of content between the communication device and the UE.

At 1302, a request for content and associated information indicative of display characteristics of the UE can be received. The UE can generate a request for content (e.g., content including a visual image or video content). The UE communication management component can provide display-characteristics-related information to the communication device (e.g., communication management component) in relation to (e.g., as part of) the request for content.

At 1304, the information indicative of display characteristics of the UE can be analyzed. The communication management component can analyze the display-characteristics-related information to facilitate determining whether to adjust certain content (e.g., visual image(s), video content) associated with the content request.

At 1306, at least a portion of the content can be adjusted based at least in part on the display-characteristics-related information. The communication management component can adjust at least a portion (e.g., visual image(s) or video content) of the requested content to correspond to the display characteristics of the UE in accordance with the display-characteristics-related information associated with the UE. For example, the communication management component can adjust (e.g., decrease) the size of a visual image(s) or video content to correspond to the display characteristics (e.g., display screen dimensions or resolution) of the UE in accordance with the display-characteristics-related information associated with the UE.

At 1308, the content, including the adjusted portion of the content, can be transmitted, e.g., to the UE. The communication device can transmit the content, including the adjusted portion (e.g., adjusted visual image(s) or video content) of the content, to the UE for presentation by the UE.

Figure 14:
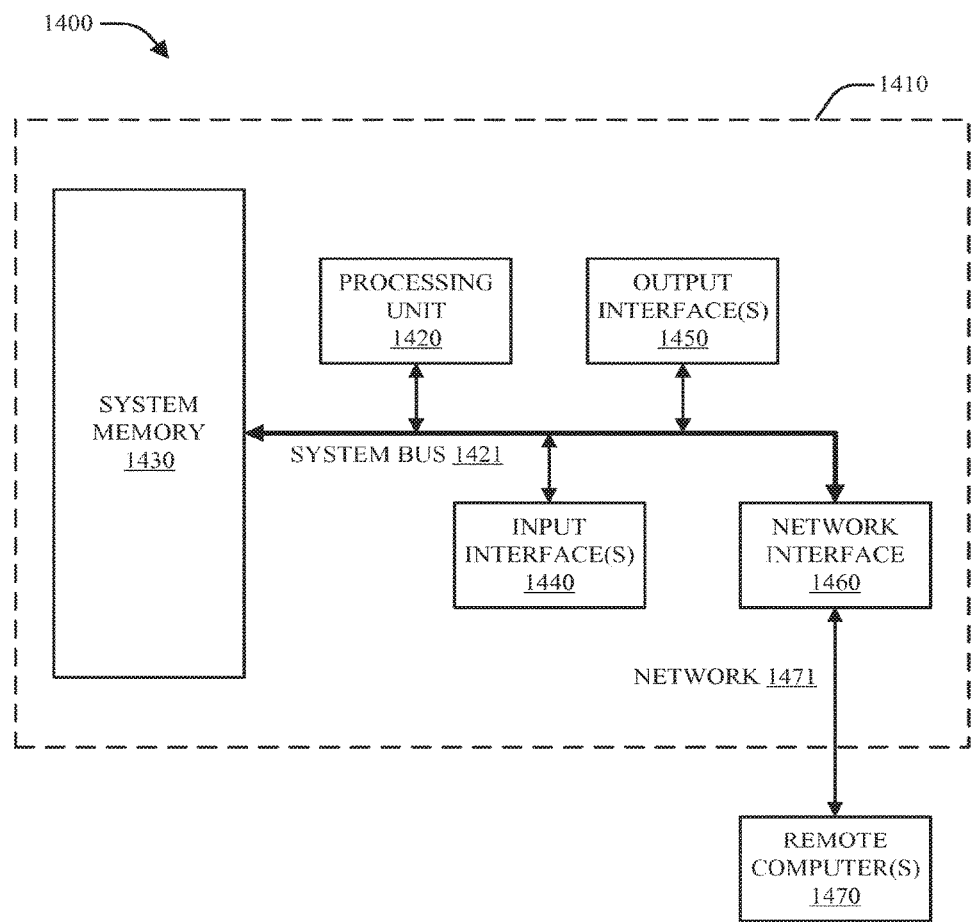
FIG. 14 illustrates an example computing system environment that is operable to execute various aspects of the disclosed subject matter described herein.

Turning to FIG. 14, a non-limiting example computing system or operating environment in which various aspects of the disclosed subject matter can be implemented is illustrated. One of ordinary skill in the art can appreciate that handheld, portable and other computing devices and computing objects of all kinds are contemplated for use in connection with the disclosed subject matter, e.g., anywhere that a communications system may be desirably configured. Accordingly, the below general purpose remote computer described below in FIG. 14 is but one example of a computing system in which the disclosed subject matter may be implemented.

Although not required, various aspects of the disclosed subject matter can partly be implemented via an operating system, for use by a developer of services for a device or object, and/or included within application software that can operate in connection with the component(s) of the disclosed subject matter. Software may be described in the general context of computer-executable instructions, such as program modules, being executed by one or more computers, such as client workstations, servers or other devices. Those skilled in the art will appreciate that various aspects of the disclosed subject matter may be practiced with other computer system configurations and protocols.

FIG. 14 can thus illustrate an example of a suitable computing system environment 1400 in which various aspects of the disclosed subject matter can be implemented, although as disclosed above, the computing system environment 1400 is only one example of a suitable computing environment for a computing system and is not intended to suggest any limitation as to the scope of use or functionality of the disclosed subject matter. Neither should the computing environment 1400 be interpreted as having any dependency or requirement relating to any one or combination of components illustrated in the example operating environment 1400.

With reference to FIG. 14, an example of a computing environment 1400 for implementing various aspects of the disclosed subject matter includes a general purpose computing device in the form of a computer 1410. Components of computer 1410 can include, but are not limited to, a processing unit 1420, a system memory 1430, and a system bus 1421 that couples various system components including the system memory to the processing unit 1420. The system bus 1421 can be any of several types of bus structures including a memory bus or memory controller, a peripheral bus, and a local bus using any of a variety of bus architectures.

Computer 1410 can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, Electrically Erasable Programmable ROM (EEPROM), flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1430 can include computer storage media in the form of volatile and/or nonvolatile memory such as read only memory (ROM) and/or random access memory (RAM). A basic input/output system (BIOS), containing the basic routines that help to transfer information between elements within computer 1410, such as during start-up, can be stored in memory 1430. Memory 1430 also can contain data and/or program modules that can be immediately accessible to and/or presently being operated on by processing unit 1420. By way of example, and not limitation, memory 1430 also can include an operating system, application programs, other program modules, and program data.

The computer 1410 can also include other removable/non-removable, volatile/nonvolatile computer storage media. For example, computer 1410 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1421 through a non-removable memory interface such as an interface, and a magnetic disk drive or optical disk drive can be connected to the system bus 1421 by a removable memory interface, such as an interface.

A user can enter commands and information into the computer 1410 through input devices, such as a keyboard and pointing device, commonly referred to as a mouse, trackball or touch pad. Other input devices can include a microphone, joystick, game pad, satellite dish, scanner, or the like. These and other input devices 1440 are often connected to the processing unit 1420 through an input interface(s) 1440 and/or associated interface(s) that can be coupled to the system bus 1421, but can be connected by other interfaces and bus structures, such as a parallel port, game port or a universal serial bus (USB). A graphics subsystem can also be connected to the system bus 1421. A monitor or other type of display device also can be connected to the system bus 1421 via an interface, such as output interface(s) 1450, which can in turn communicate with video memory. In addition to a monitor, computers can also include other peripheral output devices such as speakers and a printer, which can be connected through output interface(s) 1450.

The computer 1410 can operate in a networked or distributed environment using logical connections to one or more other remote computers, such as remote computer 1470, which can in turn have media capabilities different from device 1410. The remote computer 1470 can be a personal computer, a server, a router, a network PC, a peer device or other common network node, or any other remote media consumption or transmission device, and can include any or all of the elements described above relative to the computer 1410. The logical connections depicted in FIG. 14 include a network 1471, such local area network (LAN) or a wide area network (WAN), but can also include other networks/buses. Such networking environments are commonplace in homes, offices, enterprise-wide computer networks, intranets and the Internet.

When used in a LAN networking environment, the computer 1410 can be connected to the LAN 1471 through a network interface or adapter. When used in a WAN networking environment, the computer 1410 can include a communications component, such as a modem, or other means for establishing communications over the WAN, such as the Internet. A communications component, such as a modem, which can be internal or external, can be connected to the system bus 1421 via an input interface(s) 1440, or other appropriate mechanism. In a networked environment, program modules depicted relative to the computer 1410, or portions thereof, can be stored in a remote memory storage device. It will be appreciated that the network connections shown and described are exemplary and other means of establishing a communications link between the computers can be used.

It is to be appreciated and understood that components (e.g., UE, AP, communication network, UE communication management component, communication management component, etc.), as described with regard to a particular system or method, can include the same or similar functionality as respective components (e.g., respectively named components or similarly named components) as described with regard to other systems or methods disclosed herein.

As used in this application, the terms "component," "system," "platform," "layer," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, computer-executable instructions, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which can be operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings are to be construed to mean "one or more" unless specified otherwise or clear from context to be directed to a singular form.

Moreover, terms like "user equipment", "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); ZigBee, and/or other 802.XX wireless technologies, including, for example, wireless technologies using 802.11a, b, g, or n; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
with regard to content comprising a first portion of the content and a second portion of the content, and based on jitter information associated with the second portion of the content, determining whether a data transfer time for a second communication of the second portion of the content is permitted to be modified to delay the second communication via a second data burst for a defined amount of time after a first communication of the first portion of the content via a first data burst, wherein the jitter information indicates an amount of time delay from the data transfer time that is permitted; and determining whether the first portion of the content and the second portion of the content are permitted to be communicated using separate data bursts comprising the first data burst and the second data burst based on a result of the determining whether the data transfer time is permitted to be modified.

2. The system of claim 1, wherein the operations further comprise:
in response to determining that the first portion of the content and the second portion of the content are permitted to be communicated between a first device and a second device using the separate data bursts:
communicating the first portion of the content via the first data burst; and
communicating the second portion of the content via the second data burst.

3. The system of claim 1, wherein the content is initially scheduled to be communicated between a first device and a second device via a continuous stream at a defined bitrate, and wherein the determining whether the first portion of the content and the second portion of the content are permitted to be communicated using the separate data bursts comprises:
determining whether the first portion of the content and the second portion of the content are permitted to be communicated between the first device and the second device using the separate data bursts as an alternative to the first portion of the content and the second portion of the content being communicated between the first device and the second device via the continuous stream at the defined bitrate.

4. The system of claim 1, wherein the jitter information comprises a jitter parameter that indicates the amount of the time delay from the data transfer time that is permitted, and wherein the operations further comprise:
modifying the jitter parameter to modify the amount of the time delay from the data transfer time that is permitted.

5. The system of claim 4, wherein the modifying the jitter parameter comprises increasing the jitter parameter to increase the amount of the time delay from the data transfer time that is permitted to facilitate reducing a number of data bursts associated with data transfers.

6. The system of claim 1, wherein the operations further comprise:
analyzing the jitter information, the data transfer time for the second communication of the second portion of the content, and a time period associated with the first communication of the first portion of the content with the first data burst, and
wherein the determining whether the data transfer time for the second communication of the second portion of the content is permitted to be modified comprises, based on an analysis result of the analyzing of the jitter information, the data transfer time, and the time period, determining whether the data transfer time for the second communication of the second portion of the content is permitted to be modified to delay the second communication of the second portion of the content via the second data burst for the defined amount of time after the first communication of the first portion of the content via the first data burst.

7. The system of claim 1, wherein the determining whether the data transfer time for the second communication of the second portion of the content is permitted to be modified comprises:
based on the jitter information and at least one defined traffic communication criterion, determining whether the data transfer time for the second communication of the second portion of the content is permitted to be modified to delay the second communication of the second portion of the content via the second data burst for the defined amount of time after the first communication of the first portion of the content via the first data burst,
wherein the at least one defined traffic communication criterion is at least one member of a group of defined traffic communication criteria that comprises a first traffic communication criterion relating to a subscription associated with the content, a second traffic communication criterion relating to a content provider policy, and a third traffic communication criterion relating a preference of a user identity associated with a device that is associated with communication of the content.

8. The system of claim 1, wherein the operations further comprise scheduling communications of respective data transfers of respective portions of the content to a first device from a second device, and wherein the respective portions of the content comprise the first portion of the content and the second portion of the content.

9. The system of claim 8, wherein the respective data transfers comprise a first data transfer, comprising the first portion of the content, and a second data transfer, comprising the second portion of the content, and wherein the scheduling of the communications of the respective data transfers comprises:
scheduling the first communication of the first data transfer, comprising the first portion of the content, from the second device to the first device to occur at a first time, wherein the first data transfer is communicated via the first data burst; and
in accordance with the jitter information, scheduling the second communication of the second data transfer, comprising the second portion of the content, from the second device to the first device to occur at a second time that is within a specified amount of time of a third transmission of a third data transfer, comprising different content, that is to be transmitted from a third device to the first device, to facilitate the second data transfer and the third data transfer being communicated in a same data burst of the separate data bursts, and wherein the same data burst is the second data burst.

10. A method, comprising:
with regard to a first portion of content and a second portion of the content, and based on a data transfer parameter associated with the second portion of the content, determining, by a system comprising a processor, whether a data transfer start time for a second communication of the second portion of the content is able to be adjusted to delay the second communication of the second portion of the content with a second data burst for a defined amount of time after a first communication of the first portion of the content via a first data burst, wherein the data transfer parameter indicates an amount of time deviation from the data transfer start time that is acceptable; and
determining, by the system, whether communicating the content via individual data bursts is acceptable, wherein the individual data bursts comprise the first data burst comprising the first portion of the content and the second data burst comprising the second portion of the content.

11. The method of claim 10, further comprising:
in response to determining that the communicating of the content via the individual data bursts is acceptable:
communicating, by the system, the first portion of the content via the first data burst at a first data transfer time; and
communicating, by the system, the second portion of the content, via the second data burst at a second data transfer time that is determined to be compatible with the data transfer start time and the data transfer parameter.

12. The method of claim 10, wherein the content is initially scheduled to be streamed to a device via a continuous stream at a specified bitrate, and wherein the determining whether the communicating the content via the individual data bursts is acceptable comprises determining whether the communicating of the content to the device via the individual data bursts is acceptable as an alternative to the content being communicated to the device via the continuous stream at the specified bitrate.

13. The method of claim 10, wherein the determining whether the data transfer start time for the second communication of the second portion of the content is able to be adjusted comprises:
based on the data transfer parameter and a defined traffic communication criterion relating to presentation of the content without disruption, determining whether the data transfer start time for the second communication of the second portion of the content to a device is able to be adjusted to delay the second communication of the second portion of the content with the second data burst for the defined amount of time after the first communication of the first portion of the content, as part of the first data burst, to the device, without the disruption of the presentation of the content by the device.

14. The method of claim 10, wherein a first data transfer comprises the first portion of the content and a second data transfer comprises the second portion of the content, and wherein the method further comprises:
scheduling, by the system, the first communication of the first data transfer, comprising the first portion of the content, to a first device from a second device at a first time;
based on the data transfer parameter, scheduling, by the system, the second communication of the second data transfer, comprising the second portion of the content, to the first device from the second device at a second time that occurs within a specified amount of time of a third data transfer, comprising different content, to be communicated from a third device to the first device, to facilitate communicating the second data transfer and the third data transfer in a same data burst of the individual data bursts, wherein the same data burst is the second data burst;
communicating, by the system, the first data transfer in the first data burst; and
communicating, by the system, the second data transfer and the third data transfer in the second data burst.

15. The method of claim 14, wherein the third data transfer is a periodic data transfer.

16. The method of claim 15, wherein the periodic data transfer is associated with a periodicity parameter that indicates a defined period of time between two periodic data transfers associated with an application, and wherein the method further comprises:
adjusting, by the system, the periodicity parameter to adjust the defined period of time between the two periodic data transfers, comprising the periodic data transfer, associated with the application.

17. The method of claim 14, wherein the third data transfer is an aperiodic data transfer.

18. The method of claim 10, further comprising:
in response to determining that the communicating of the content via the individual data bursts is acceptable, storing, by the system, the second portion of the content in a queue to buffer the second portion of the content until the data transfer start time of the second communication of the second portion of the content with the second data burst.

19. A non-transitory machine-readable storage medium, comprising executable instructions that, when executed by a processor, facilitate performance of operations, comprising:
with regard to content comprising a first subset of the content and a second subset of the content, based on a jitter parameter associated with the second subset of content, determining whether a data transfer time for a second transmission of the second subset of the content to a device is adjustable to delay the second transmission of the second subset of the content with a second data burst to the device for a defined amount of time after a first transmission of the first subset of the content with a first data burst to the device, wherein the jitter parameter indicates an amount of time adjustment from the data transfer time that is acceptable; and
based on a result of the determining whether the data transfer time for the second transmission of the second subset of the content to the device is adjustable, determining whether the content is transmittable to the device via separate data bursts comprising the first data burst and the second data burst.

20. The non-transitory machine-readable storage medium of claim 19, wherein the operations further comprise:
in response to determining that the content is transmittable to the device via the separate data bursts:
transmitting, to the device, the first subset of the content with the first data burst at a first data transfer time; and
transmitting, to the device, the second subset of the content with the second data burst at a second data transfer time.

* * * * *